(12) United States Patent
Shimura et al.

(10) Patent No.: US 12,709,339 B2
(45) Date of Patent: Aug. 18, 2026

(54) CRAWLER-TYPE TRAVELING BODY AND TRAVELING APPARATUS

(71) Applicants: Hiroshi Shimura, Kanagawa (JP); Eichi Koizumi, Kanagawa (JP); Taku Kitahara, Tokyo (JP); Hiroshi Okamoto, Kanagawa (JP)

(72) Inventors: Hiroshi Shimura, Kanagawa (JP); Eichi Koizumi, Kanagawa (JP); Taku Kitahara, Tokyo (JP); Hiroshi Okamoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 627 days.

(21) Appl. No.: 18/029,094

(22) PCT Filed: Sep. 27, 2021

(86) PCT No.: PCT/JP2021/035284
§ 371 (c)(1),
(2) Date: Mar. 29, 2023

(87) PCT Pub. No.: WO2022/071193
PCT Pub. Date: Apr. 7, 2022

(65) Prior Publication Data

US 2023/0373577 A1 Nov. 23, 2023

(30) Foreign Application Priority Data

Sep. 30, 2020 (JP) ................................ 2020-164419
Jun. 3, 2021 (JP) ................................ 2021-093610

(51) Int. Cl.
*B62K 25/30* (2006.01)
*B62D 55/06* (2006.01)
(Continued)

(52) U.S. Cl.
CPC ........... *B62D 55/06* (2013.01); *B62D 55/092* (2013.01); *B62D 55/12* (2013.01); *B62D 55/14* (2013.01); *B62D 55/30* (2013.01)

(58) Field of Classification Search
CPC ........ B62D 55/06; B62D 55/14; B62D 55/30; B62D 55/305; B62D 55/10; B62D 55/15; B62D 55/12
(Continued)

(56) References Cited

U.S. PATENT DOCUMENTS 4,141,598 A * 2/1979 Cline .................... B62D 55/15 384/418
2010/0051358 A1 3/2010 Inaoka
(Continued)

FOREIGN PATENT DOCUMENTS

CN 105438296 A 3/2016
CN 205396260 U 7/2016
(Continued)

OTHER PUBLICATIONS

International Search Report issued on Nov. 2, 2021 in PCT/JP2021/035284 filed on Sep. 27, 2021, 5 pages.
(Continued)

*Primary Examiner* — Valentin Neacsu
*Assistant Examiner* — Nabin Kumar Sharma
(74) *Attorney, Agent, or Firm* — XSENSUS LLP

(57) ABSTRACT

A crawler-type traveling body includes: a crawler; a drive wheel including a drive shaft, the drive wheel configured to apply a driving force to the crawler; at least two track rollers disposed below the drive wheel, the crawler being stretched around the drive wheel and said at least two track rollers; and an auxiliary mechanism between said at least two track rollers, the auxiliary mechanism includes two auxiliary wheels swingably provided, wherein a push-up amount of
(Continued)

one of the two auxiliary wheels pushed up in a vertical direction is larger than a push-down amount of another of the two auxiliary wheels pushed down in the vertical direction.

14 Claims, 22 Drawing Sheets

(51) Int. Cl.

| | |
|---|---|
| ***B62D 55/092*** | (2006.01) |
| ***B62D 55/12*** | (2006.01) |
| ***B62D 55/14*** | (2006.01) |
| ***B62D 55/30*** | (2006.01) |
| ***B62K 3/02*** | (2006.01) |
| ***B62K 25/04*** | (2006.01) |

(58) Field of Classification Search
USPC .......................................................... 180/9.1
See application file for complete search history.

(56) References Cited

U.S. PATENT DOCUMENTS

| | | | | |
|---|---|---|---|---|
| 2010/0194188 | A1 | 8/2010 | Johnson et al. | |
| 2012/0217071 | A1* | 8/2012 | Fukumoto .......... | B62D 49/0635 180/9.34 |
| 2012/0242142 | A1 | 9/2012 | Kautsch et al. | |
| 2012/0274130 | A1 | 11/2012 | Johnson et al. | |
| 2015/0321709 | A1* | 11/2015 | Sewell .................. | B62D 55/12 305/120 |
| 2017/0210434 | A1 | 7/2017 | Brazier | |
| 2017/0305483 | A1* | 10/2017 | Rehberg ............... | B62D 55/084 |
| 2019/0118879 | A1 | 4/2019 | Gustafson | |
| 2020/0055554 | A1* | 2/2020 | Kautsch ............... | B62D 55/112 |

FOREIGN PATENT DOCUMENTS

| | | | | | |
|---|---|---|---|---|---|
| CN | 104943759 | B | * | 6/2018 | ............. B62D 55/08 |
| CN | 108263502 | A | | 7/2018 | |
| CN | 110329375 | A | * | 10/2019 | ........... B62D 55/065 |
| CN | 210310621 | U | * | 4/2020 | ............. B62D 55/30 |
| DE | 10 2015 220 497 | A1 | | 4/2017 | |
| JP | 2-068274 | | | 3/1990 | |
| JP | 7-101365 | | | 4/1995 | |
| JP | 9-118274 | | | 5/1997 | |
| JP | 9-267779 | A | | 10/1997 | |
| JP | 2004-009835 | | | 1/2004 | |
| JP | 2005-186832 | | | 7/2005 | |
| JP | 2006-232231 | | | 9/2006 | |
| JP | 2010-139063 | | | 6/2010 | |
| JP | 2013177058 | A | * | 9/2013 | ............. B62D 55/02 |
| JP | 2014-097793 | | | 5/2014 | |
| JP | 2014-172509 | | | 9/2014 | |
| JP | 2015-155302 | | | 8/2015 | |
| JP | 2017-218105 | | | 12/2017 | |
| JP | 2019-056371 | | | 4/2019 | |
| JP | 2020026182 | A | * | 2/2020 | ............. B62D 55/14 |

OTHER PUBLICATIONS

EPO Extended European Search Report for European Application No. EP21875495.0 mailed Sep. 24, 2024 (10 pages).
Japanese Office Action issued Apr. 25, 2023, in corresponding Japanese Patent Application 2022-3632, 6pp.
Office Action issued Aug. 29, 2024 in Chinese Patent Application No. 202180064369.7, 7 pages.

* cited by examiner 1
33
35a
50
31
10a
Z
Y
X 1
33
35
35a
10a
10b
50
31
Z
X
Y 1
33
35
35a
10a
10b
50
31
Q
P
Z
Y
X 1
TRAVELING APPARATUS
50
MAIN BODY
510
501
RADIO CONTROL RECEIVER
502
CPU
503
MEMORY
P1
PROGRAM
506
COMMUNI-CATION I/F
530
BATTERY
540
TRAVEL CONTROL MOTOR DRIVER
IN-WHEEL MOTOR
14a
IN-WHEEL MOTOR
14b
550
POSITION CONTROL MOTOR DRIVER
POSITION CONTROL MOTOR
555a
POSITION CONTROL MOTOR
555b 10
11
20a
15b
13
111a
111b
25
15a
18b
19
18a
Z
Y
X 10
11
13
14
141
15a
15b
161a
161b
18a
18b
181a
181b
19
191
8
20b
27a
27b
27c
27d
111a
111b
Z
Y
X

DEFORMATION OF ELASTIC BODIES 255a AND 255b 10
20a
205a
205a
203a
201a
Z
Y
X 13
132
133
141
14

13
132
138
141
136
14
134
138
143

13
131
132
141
Q
14
133
134
136
P

FIG. 13C
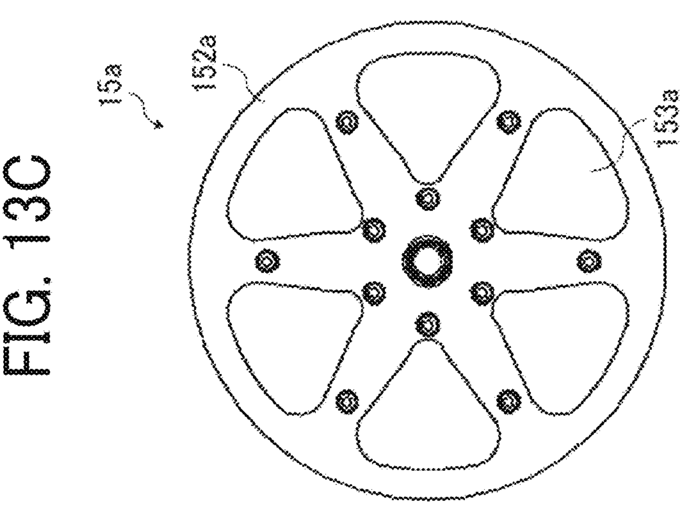
FIG. 13B
15a
151a
152a
156a
154a
FIG. 13A
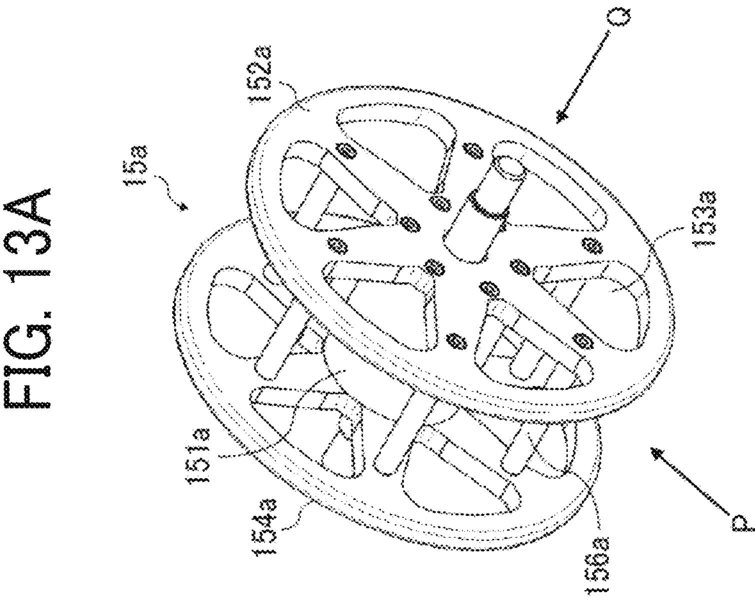

19
192b
195b
193b
193a
192a
195a
191

FIG. 17C
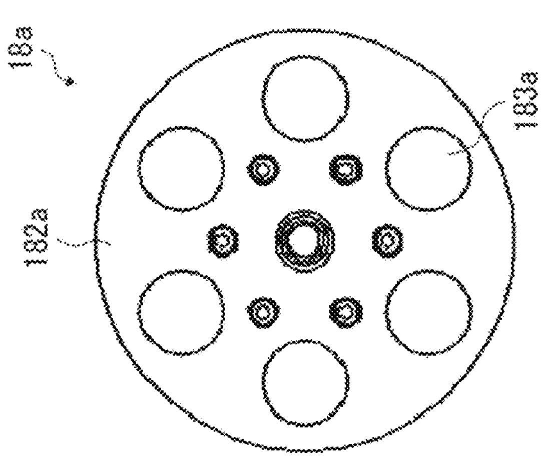
FIG. 17B
18a
182a
181a
184a
FIG. 17A
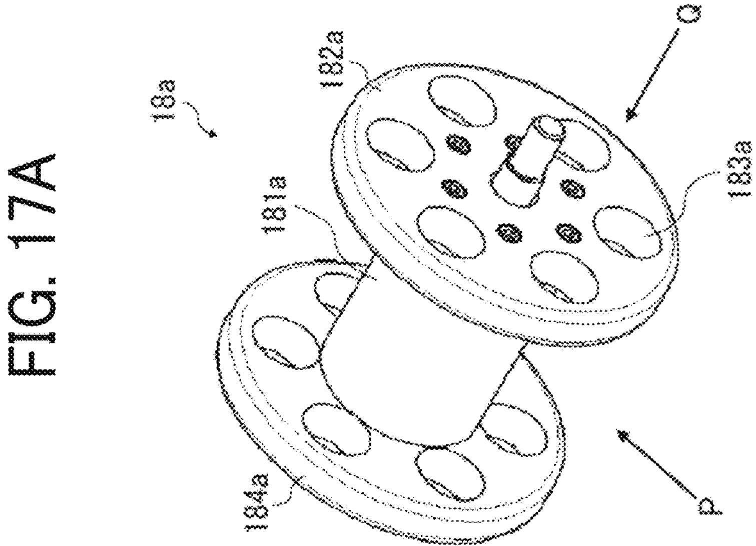

FIG. 19

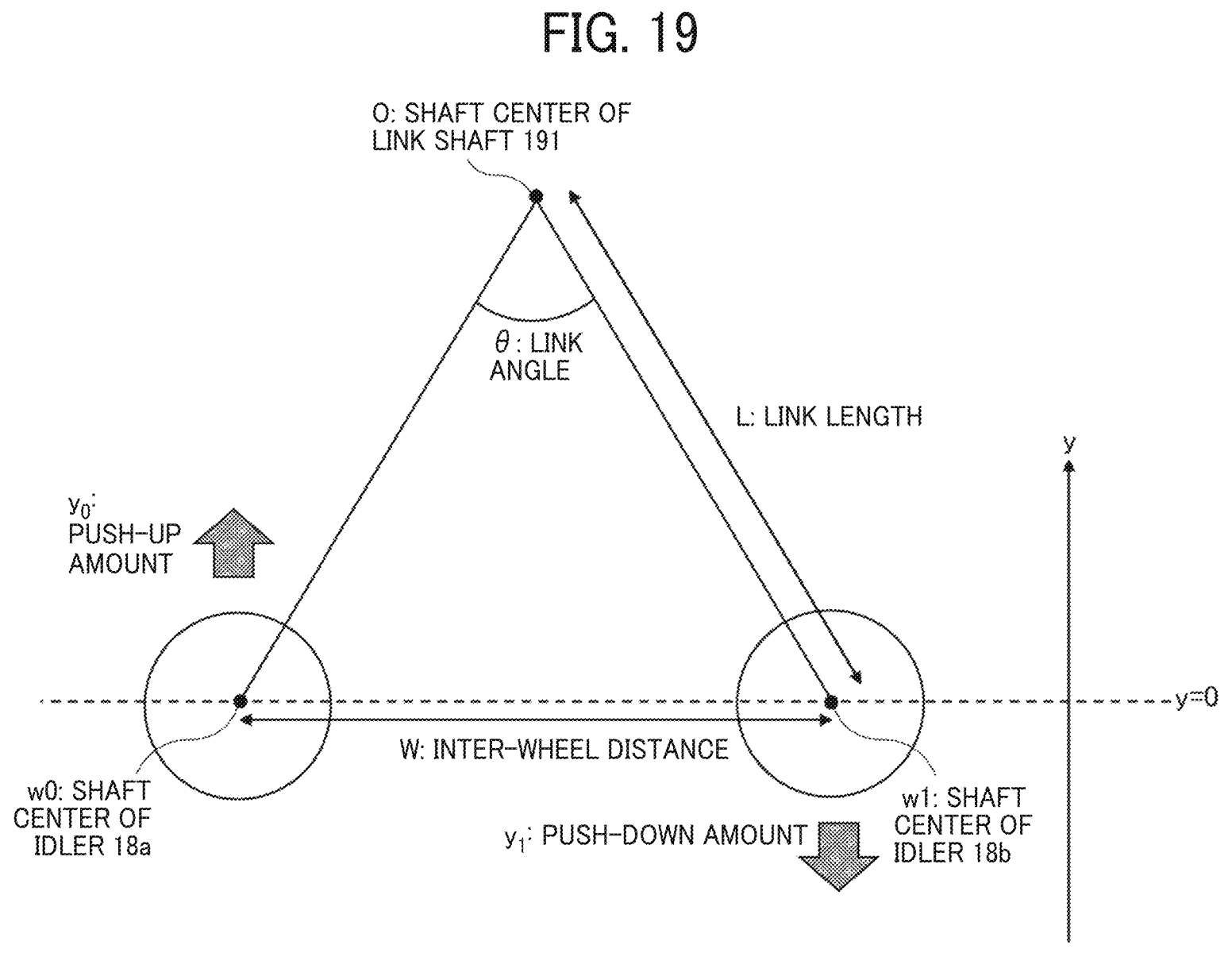

O: SHAFT CENTER OF LINK SHAFT 191

L: LINK LENGTH $\theta$ : LINK ANGLE

W: INTER-WHEEL DISTANCE w1: SHAFT CENTER OF IDLER 18b w0: SHAFT CENTER OF IDLER 18a $y_0$: PUSH-UP AMOUNT $y_1$: PUSH-DOWN AMOUNT y y=0

RELATIONSHIP BETWEEN PUSH-UP AMOUNT AND PUSH-DOWN AMOUNT
(θ = 120°)
0
10
20
30
40
50
60
70
0
-5
-10
-15
-20
-25
-30
-35
-40
-45
-50
PUSH-UP AMOUNT $y_0$ (mm)
PUSH-DOWN AMOUNT $y_1$ (mm)
L=60
L=80
L=100
L=120

CRAWLER-TYPE TRAVELING BODY AND TRAVELING APPARATUS

CROSS-REFERENCE TO RELATED APPLICATIONS

The present application is based on PCT filing PCT/JP2021/035284, filed Sep. 27, 2021, which claims priority to Japanese Patent Application No. 2020-164419, filed on Sep. 30, 2020, and Japanese Patent Application No. 2021-093610, filed on Jun. 3, 2021, the entire contents of each are incorporated herein by its reference.

TECHNICAL FIELD

The present disclosure relates to a crawler-type traveling body and a traveling apparatus.

BACKGROUND ART

In recent years, a mobile robot (traveling apparatus) has been utilized in various usage environments and for various application purposes so as to support work that has been conventionally performed manually or to perform work in an environment to which people cannot adapt. There is a demand for a traveling mechanism having high mobility and reliability so as to allow such a traveling apparatus to cope with traveling in a poor road surface environment or in a limited space.

In addition, there is known a traveling apparatus including a crawler-type traveling body so as to enhance stability during traveling. For example, Patent Literature (PTL) 1 discloses usage of a triangular crawler-type traveling unit that includes a drive sprocket with a built-in in-wheel motor and two track rollers so as to allow traveling in a stable position. Furthermore, PTL 2 discloses disposing a plurality of idler wheels at the base of a triangle formed by a drive wheel and two driven wheels arranged in a triangular manner, in a crawler traveling apparatus to be installed in a tractor.

CITATION LIST

Patent Literature

[PTL 1]
Japanese Unexamined Patent Application Publication No. 2017-218105
[PTL 2]
Japanese Unexamined Patent Application Publication No. 2015-155302

SUMMARY OF INVENTION

Technical Problem

However, when the conventional method is used for a crawler-type traveling body, an auxiliary mechanism such as an idler wheel needs to be disposed in a limited range. Therefore, the conventional method has a problem in that it is necessary to achieve both of improving traveling performance and of disposing the auxiliary mechanism within a limitation on size.

Solution to Problem

A crawler-type traveling body includes: a crawler; a drive wheel including a drive shaft, the drive wheel configured to apply a driving force to the crawler; at least two track rollers disposed below the drive wheel, the crawler being stretched around the drive wheel and said at least two track rollers; and an auxiliary mechanism between said at least two track rollers, the auxiliary mechanism includes two auxiliary wheels swingably provided, wherein a push-up amount of one of the two auxiliary wheels pushed up in a vertical direction is larger than a push-down amount of another of the two auxiliary wheels pushed down in the vertical direction.

Advantageous Effects of Invention

The present disclosure achieves the effect of enabling a crawler-type traveling body to be provided which improves stability of a traveling apparatus during traveling.

BRIEF DESCRIPTION OF DRAWINGS

A more complete appreciation of embodiments of the present disclosure and many of the attendant advantages and features thereof can be readily obtained and understood from the following detailed description with reference to the accompanying drawings

FIG. 8 is a diagram for describing a change in a state of the tensioner.

FIGS. 13A to 13C are diagrams showing an example of a configuration of a track roller provided in the crawler-type traveling body.

FIGS. 17A to 17C are diagrams showing an example of a configuration of an idler.

FIG. 19 is a diagram for describing the example of the detailed configuration of the auxiliary mechanism.

Figures 1A, 1B, 1C:
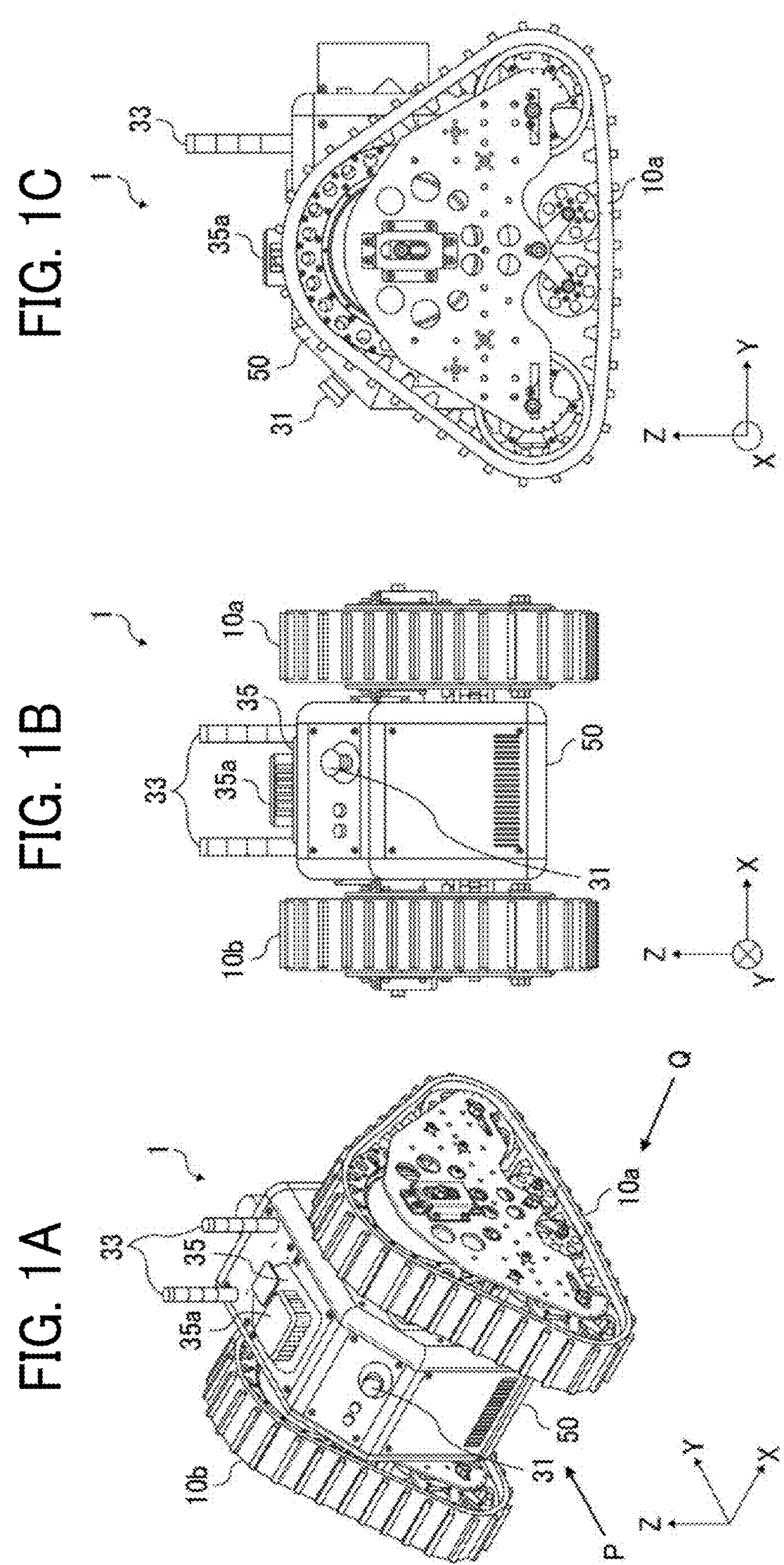
FIGS. 1A to 1C are diagrams showing an example of external appearance of a traveling apparatus.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, an embodiment for carrying out the invention will be described with reference to the drawings. In the description of the drawings, the same elements are denoted by the same reference numerals, and redundant description is omitted.

As used herein, the singular forms "a," "an," and "the" are intended to include the plural forms as well, unless the context clearly indicates otherwise.

Embodiment

[Traveling Apparatus]

FIG. 1A is an external perspective view of a traveling apparatus. A traveling apparatus 1 includes crawler-type traveling bodies 10*a* and 10*b* and a main body 50.

The crawler-type traveling bodies 10*a* and 10*b* are units serving as moving units of the traveling apparatus 1. The crawler-type traveling bodies 10*a* and 10*b* are crawler-type traveling bodies using a belt made of metal or rubber. A crawler-type traveling body has a wider ground contact area than a traveling body traveling with tires, such as an automobile. Therefore, the crawler-type traveling body can stably travel even in, for example, an environment where footing is poor. A traveling body traveling with tires requires a turning space when performing rotational motion. Meanwhile, a traveling apparatus including a crawler-type traveling body can perform a so-called spin turn, so that the traveling apparatus can smoothly perform rotational motion even in a limited space. Detailed configurations of the crawler-type traveling bodies 10*a* and 10*b* will be described below.

The main body 50 is a support that supports the crawler-type traveling bodies 10*a* and 10*b* in such a way as to allow the crawler-type traveling bodies 10*a* and 10*b* to travel, and is also a control device that performs control for driving the traveling apparatus 1. In addition, the main body 50 is equipped with a battery 530 to be described below which supplies power for driving the crawler-type traveling bodies 10*a* and 10*b*.

FIG. 1B is a front view of the traveling apparatus (a view of the traveling apparatus taken in the direction of arrow P). The main body 50 of the traveling apparatus 1 includes an emergency stop button 31, status indicator lamps 33, and a lid 35. The emergency stop button 31 is an operation unit to be pressed by a person around the traveling apparatus 1 so as to stop the traveling apparatus 1 that is traveling.

The status indicator lamp 33 is a notification unit for notifying the state of the traveling apparatus 1. When the state of the traveling apparatus 1 changes due to, for example, a decrease in remaining battery life, the status indicator lamp 33 is turned on so as to notify people around the traveling apparatus 1 of the change in the state of the traveling apparatus 1. In addition, the status indicator lamp 33 is turned on in a case where there is a possibility that an anomaly has occurred, such as a case where it has been detected that there is an obstacle that hinders traveling of the traveling apparatus 1. Note that FIGS. 1A to 1C illustrate an example in which the traveling apparatus 1 includes two status indicator lamps 33, but the number of the status indicator lamps 33 may be one, or may be three or more. The notification unit may be configured such that the state of the traveling apparatus 1 is notified not only by the status indicator lamp 33 but also by a warning sound or the like emitted from a speaker.

The lid 35 is provided on the upper surface of the main body 50, and covers the inside of the main body 50. In addition, the lid 35 includes a ventilator 35*a* having a vent hole for ventilating the inside of the main body 50.

The two crawler-type traveling bodies 10*a* and 10*b* are installed such that a crawler 11*a* and a crawler 11*b* to be described below are substantially parallel to each other with the main body 50 interposed therebetween, that is, installed in a state where the traveling apparatus 1 can travel. The number of the crawler-type traveling bodies is not limited to two, and may be three or more. For example, the traveling apparatus 1 may be installed in another state in which the traveling apparatus 1 can travel, such as a state in which three crawler-type traveling bodies are arranged in parallel in three rows. Alternatively, the traveling apparatus 1 may include, for example, four crawler-type traveling bodies arranged in front, rear, left, and right as with tires of an automobile.

FIG. 1C is a side view of the traveling apparatus (a view of the traveling apparatus taken in the direction of arrow Q). The crawler-type traveling body 10*a* has a triangular shape formed by a drive wheel 13 and two track rollers 15*a* and 15*b* to be described below. For example, when a front part and a rear part of the crawler-type traveling body 10*a* having a triangular shape are limited in size, the crawler-type traveling body 10*a* can increase a ground contact area within the limitation on the size of the front part and rear part of the crawler-type traveling body 10*a*. As a result, stability can be improved during traveling. Meanwhile, a so-called tank-type crawler with an upper side (drive wheel side) longer than a lower side (track roller side) has a smaller ground contact area, and is thus unstable as a whole when a front part and a rear part of the crawler are limited in size. As described above, the crawler-type traveling body 10*a* is effective in enhancing traveling performance of the traveling apparatus 1 that is relatively small.

Figure 2:
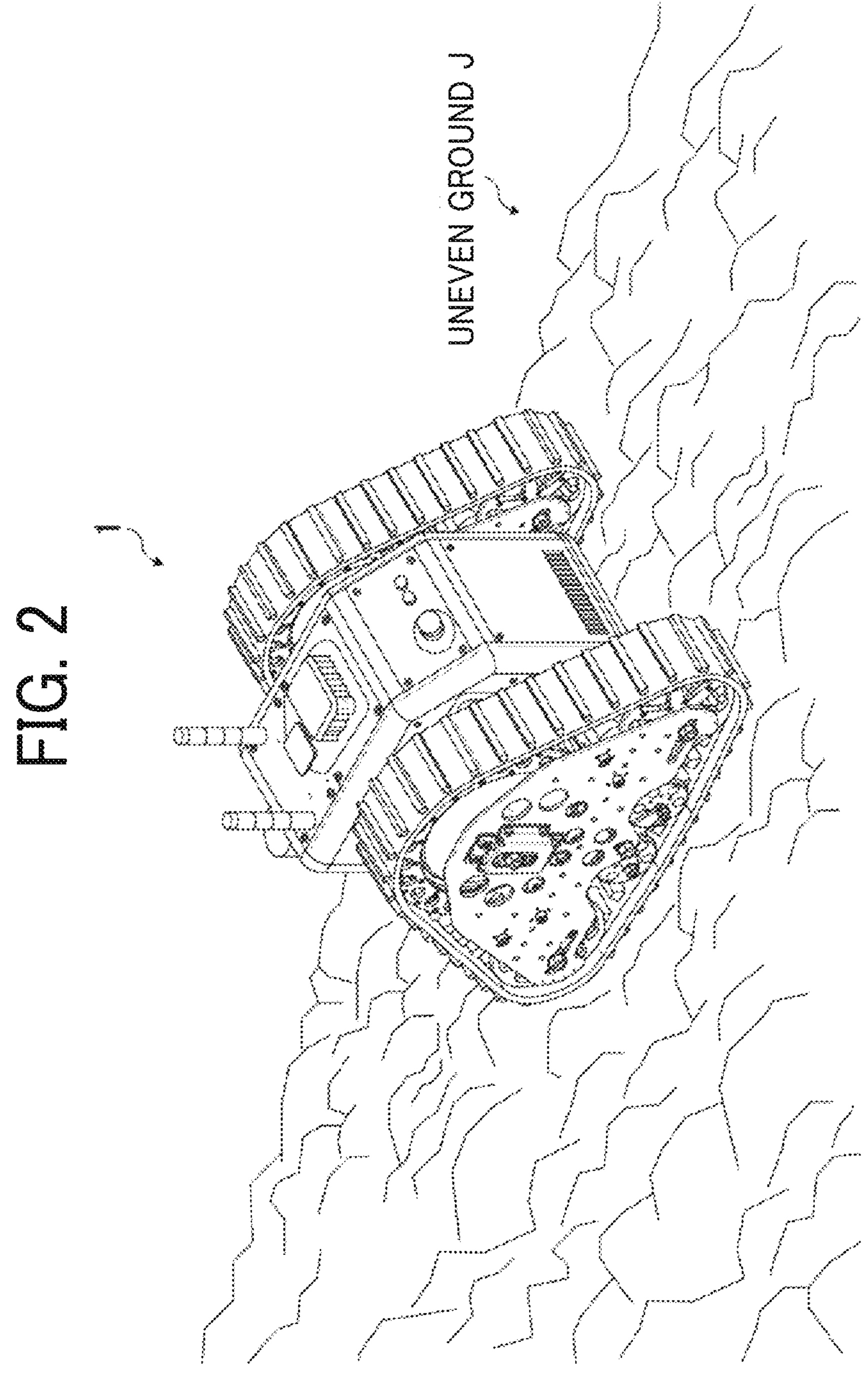
FIG. 2 is a diagram showing an example of a traveling state of the traveling apparatus.

Here, a state in which the traveling apparatus 1 is traveling will be schematically described with reference to FIG. 2. FIG. 2 is a diagram showing an example of a traveling state of the traveling apparatus. The traveling apparatus 1 includes the crawler-type traveling bodies 10*a* and 10*b* as illustrated in FIGS. 1A to 1C. Thus, the traveling apparatus 1 can stably travel even on uneven ground J as illustrated in FIG. 2.

There are cases where part of the crawler of the crawler-type traveling body cannot be in contact with the ground, and may be lifted off the ground due to unevenness of a road surface of the uneven ground J on which the crawler-type traveling body travels. Therefore, conventionally, there has been a traveling body equipped with an independent suspension or the like so that each wheel can independently move in such a way as to follow a road surface on which the traveling body travels. However, such a conventional method is intended for a traveling body that is relatively large in size. Therefore, it is difficult to apply such a conventional method to a small traveling body in terms of installation size and the cost of parts.

Therefore, the traveling apparatus 1 uses the crawler-type traveling bodies 10*a* and 10*b* including an auxiliary mechanism 8 to be described below so that each wheel can independently move in such a way as to follow a road surface on which the traveling apparatus 1 travels. As a result, road-hugging properties and traveling stability can be improved.

[Hardware Configuration]

Next, a hardware configuration of the traveling apparatus according to the embodiment will be described with reference to FIG. 3. Note that a constituent element may be added to or deleted from the hardware configuration illustrated in FIG. 3, as necessary.

Figure 3:
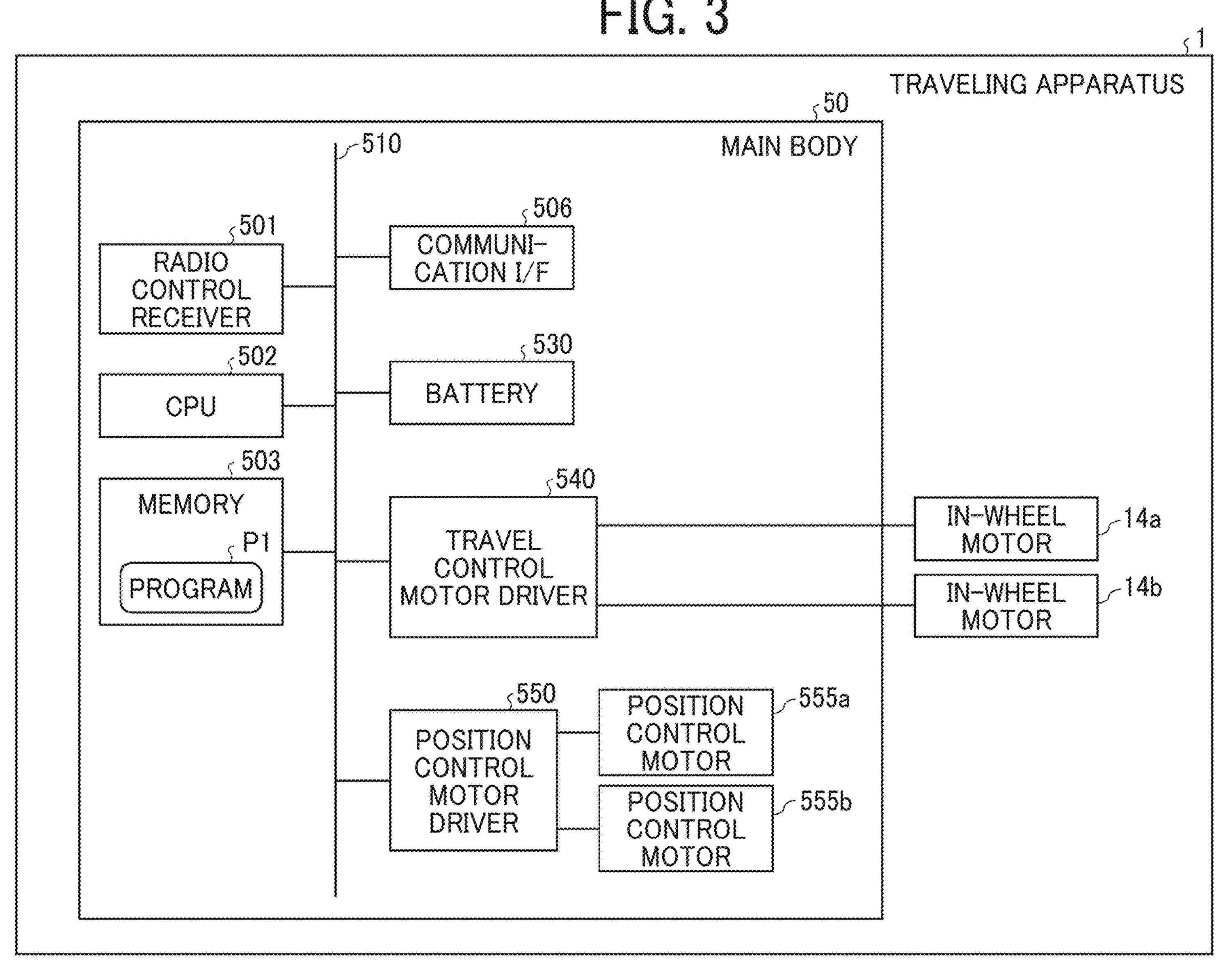
FIG. 3 is a diagram showing an example of a hardware configuration of the traveling apparatus.

FIG. 3 is a diagram showing an example of the hardware configuration of the traveling apparatus. As illustrated in FIGS. 1A to 1C, the traveling apparatus 1 includes the main body 50 that controls processing or operation of the traveling apparatus 1. The main body 50 includes a radio control receiver 501, a central processing unit (CPU 502), a memory 503, a communication interface (I/F 506), the battery 530, a travel control motor driver 540, a position control motor driver 550, and position control motors 555*a* and 555*b*. The radio control receiver 501, the CPU 502, the memory 503, the communication I/F 506, the battery 530, the travel control motor driver 540, and the position control motor driver 550 are connected via a system bus 510. The system bus 510 includes an address bus, a data bus, and the like for electrically connecting the above-described constituent elements, and transmits an address signal, a data signal, various control signals, and the like.

The radio control receiver 501 receives a motion instruction signal transmitted from a transmitter such as a personal computer (PC) being used by an operator of the traveling apparatus 1. The CPU 502 controls the entire traveling apparatus 1. The CPU 502 is an arithmetic device that reads, from the memory 503, a program P1 or various data necessary for operation of the traveling apparatus 1 stored in the memory 503, and executes processing to implement each function of the traveling apparatus 1.

The memory 503 stores various data necessary for operation of the traveling apparatus 1, including the program P1 to be executed by the CPU 502. The program P1 is embedded in the memory 503 in advance before being provided.

The program P1 may be provided as a file recorded in an installable format or an executable format on a recording medium that can be read by the CPU 502 (computer-readable recording medium) such as a CD-ROM, a flexible disk (FD), a CD-R, or a digital versatile disc (DVD). Alternatively, the program P1 may be provided such that the program P1 is stored on a computer connected to a communication network such as the Internet and downloaded into the traveling apparatus 1 via the communication network. In addition, the program P1 may be provided or distributed via a communication network such as the Internet. When the program P1 is provided from the outside, the CPU 502 reads the program P1 via the communication I/F 506.

In addition, a dedicated application specific integrated circuit (ASIC) having the same calculation function and control function as a calculation function and a control function to be executed by the program P1 may be mounted so as to cause the traveling apparatus 1 to operate in a hardware-based manner, instead of causing the CPU 502 to operate according to the program P1.

The communication I/F 506 is a communication interface that communicates (connects) with another device or apparatus via a communication network. The communication I/F 506 is a communication interface such as a wired or wireless local area network (LAN). Note that the communication I/F 506 may include a communication interface for third generation (3G), long term evolution (LTE), fourth generation (4G), fifth generation (5G), Wireless Fidelity (Wi-Fi (registered trademark)), Worldwide Interoperability for Microwave Access (WiMAX), Zigbee (registered trademark), millimeter-wave wireless communication, or the like. Alternatively, the traveling apparatus 1 may include a communication interface for performing short-range wireless communication such as near field communication (NFC) or Bluetooth (registered trademark).

The battery 530 is a power supply unit that supplies power necessary for processing or operation of the traveling apparatus 1. The battery 530 supplies power to, for example, in-wheel motors 14*a* and 14*b* (built-in in-wheel motors) and the position control motors 555*a* and 555*b*.

The travel control motor driver 540 provides motor drive signals to the in-wheel motors 14*a* and 14*b* to drive the in-wheel motors 14*a* and 14*b*.

The in-wheel motors 14*a* and 14*b* are installed inside a drive wheel 13*a* of the crawler-type traveling body 10*a* and a drive wheel 13*b* of the crawler-type traveling body 10*b*, and transmit rotative force to the drive wheels 13*a* and 13*b*, respectively. The in-wheel motors 14*a* and 14*b* cause the drive wheels 13*a* and 13*b* to rotate in a positive direction or in a negative direction, respectively. Rotation in the positive direction causes the traveling apparatus 1 to move forward. Rotation in the negative direction causes the traveling apparatus 1 to move backward.

Furthermore, the in-wheel motors 14*a* and 14*b* rotate only one of the drive wheels 13*a* and 13*b*, that is, the drive wheel 13*a* (or 13*b*) in the positive direction or the negative direction, and stop the other drive wheel, that is, the drive wheel 13*b* (or 13*a*), to cause the traveling apparatus 1 to perform a pivot turn. In addition, the in-wheel motors 14*a* and 14*b* rotate one of the drive wheels 13*a* and 13*b*, that is, the drive wheel 13*a* (or 13*b*) in the positive direction, and rotate the other drive wheel, that is, the drive wheel 13*b* (or 13*a*) in the negative direction, to cause the traveling apparatus 1 to perform a spin turn.

The position control motor driver 550 provides motor drive signals to the position control motors 555*a* and 555*b* to drive the position control motors 555*a* and 555*b*. The position control motors 555*a* and 555*b* adjust heights of idlers 18*a* and 18*b*, respectively, by moving a link 19 up and down to change the height of the link 19 according to, for example, control signals from the position control motor driver 550. The link 19 will be described below. Furthermore, the position control motors 555*a* and 555*b* controls, for example, the position of the main body 50 to prevent the traveling apparatus 1 from falling.

Note that the traveling apparatus 1 is not limited to a traveling apparatus that travels in accordance with a motion instruction received by the radio control receiver 501, and may be configured such that the traveling apparatus 1 travels by using a technique such as autonomous travel or line tracing. Alternatively, traveling of the traveling apparatus 1 may be remotely controlled by a user at a remote location such that the traveling apparatus 1 travels in accordance with a motion instruction signal transmitted via the communication network and received by means of the communication I/F 506.

[Crawler-Type Traveling Body]

Figure 4:
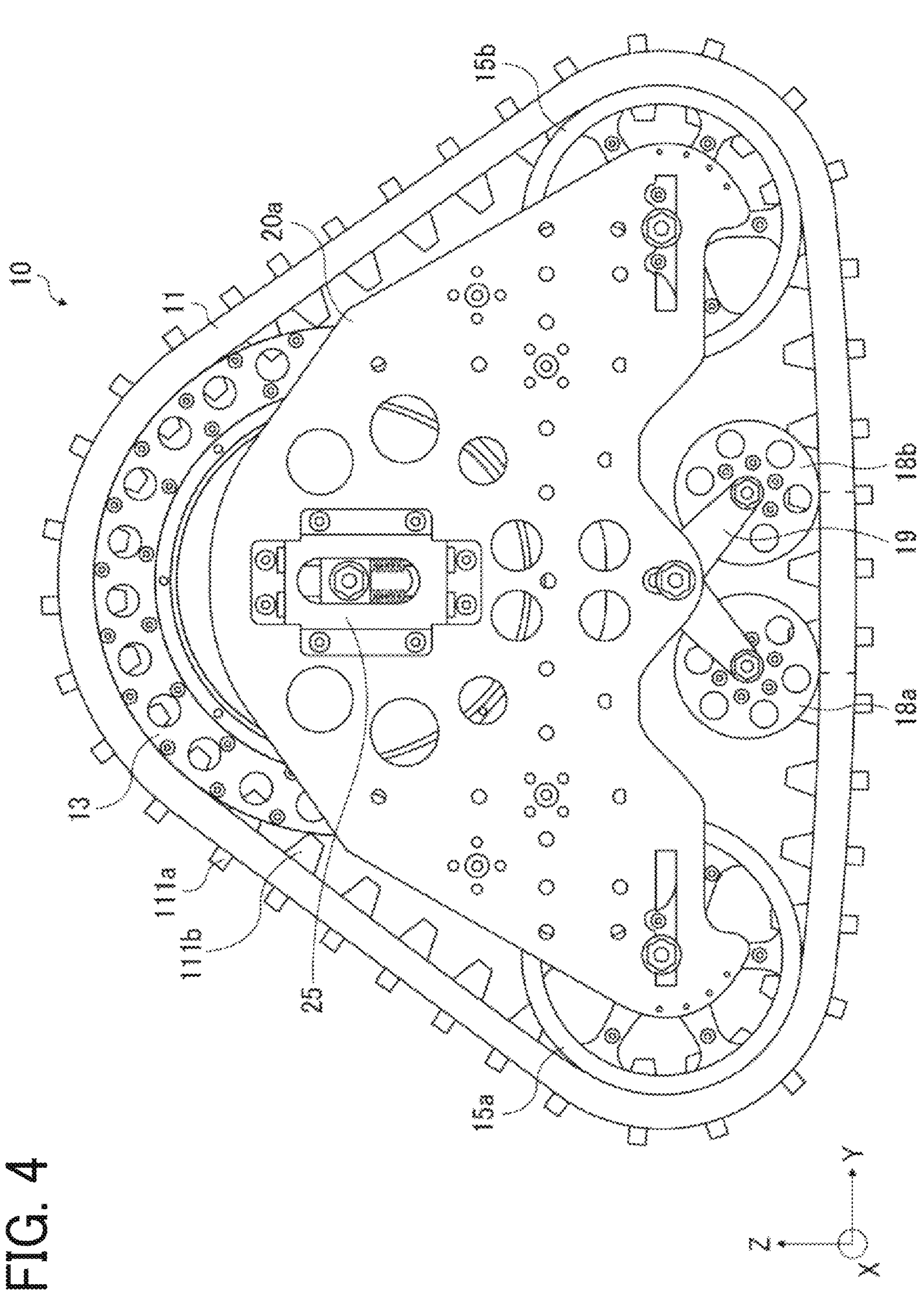
FIG. 4 is a diagram showing an example of a configuration of a crawler-type traveling body.
Figure 5:
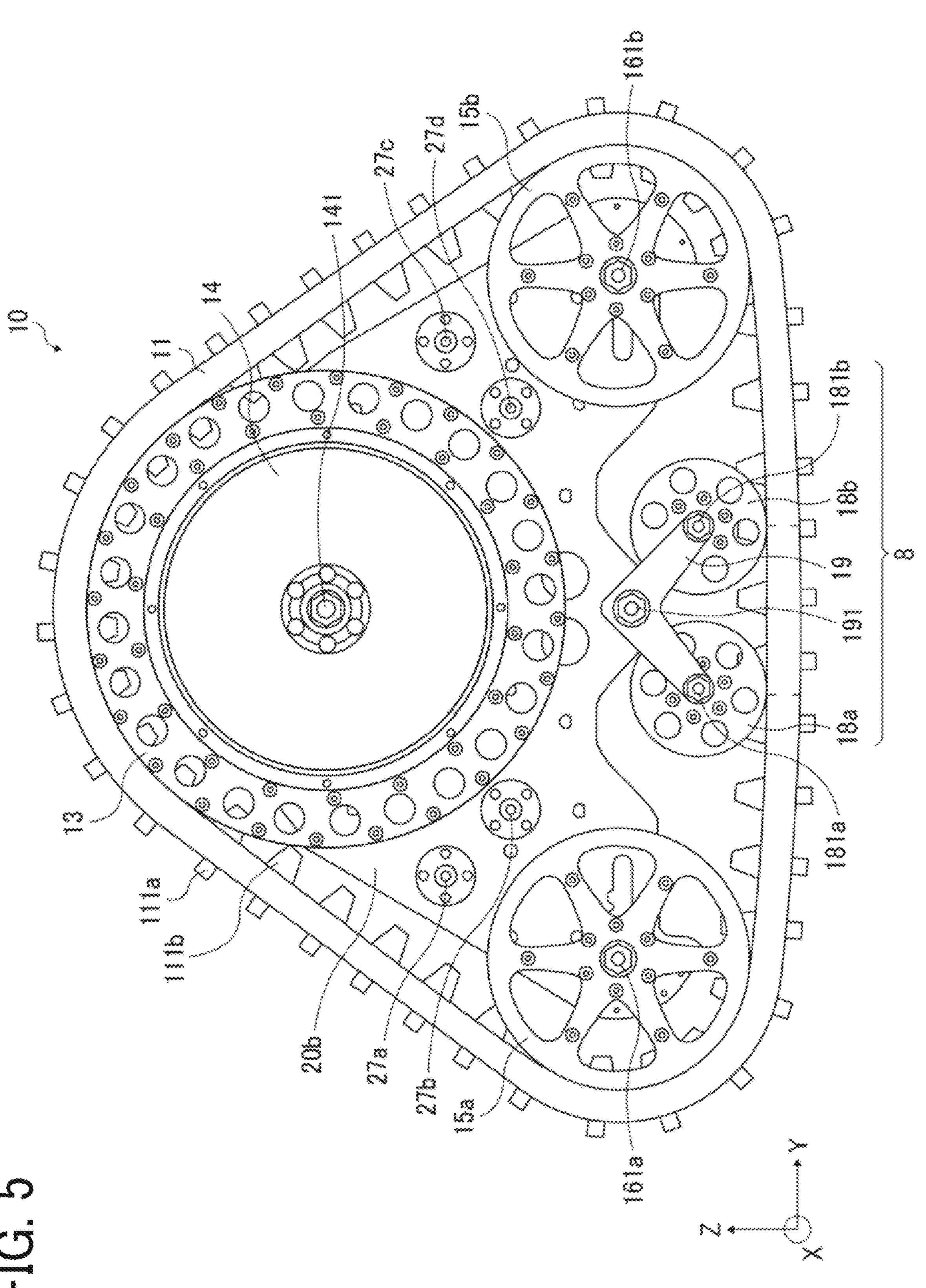
FIG. 5 is a diagram showing the example of the configuration of the crawler-type traveling body.

Next, the crawler-type traveling bodies 10*a* and 10*b* included in the traveling apparatus 1 will be described with reference to FIGS. 4 to 23. First, overall configurations of the crawler-type traveling bodies 10*a* and 10*b* will be described with reference to FIGS. 4 and 5. As illustrated in FIGS. 1A to 1C, the traveling apparatus 1 includes the two crawler-type traveling bodies 10*a* and 10*b* with the same configuration. Therefore, the configurations of the crawler-type traveling bodies 10*a* and 10*b* will be described as the configuration of the crawler-type traveling body 10 in the following description. FIGS. 4 and 5 are diagrams showing an example of the configuration of the crawler-type traveling body. FIGS. 4 and 5 are side views of the crawler-type traveling body 10 from the same direction as FIG. 1C.

As illustrated in FIG. 4, the crawler-type traveling body 10 includes the crawler 11, the drive wheel 13, the track rollers 15*a* and 15*b*, the auxiliary mechanism 8, a side plate 20*a*, and a tensioner 25. Among these constituent elements, the auxiliary mechanism 8 includes the idlers 18*a* and 18*b* and the link 19. FIG. 5 is a diagram illustrating a state where the side plate 20*a* has been removed from the crawler-type traveling body 10 illustrated in FIG. 4. The crawler-type traveling body 10 illustrated in FIG. 5 further includes the in-wheel motor 14, a motor shaft 141, a side plate 20*b*, side-plate supports 27*a*, 27*b*, 27*c*, and 27*d*, track roller shafts 161*a* and 161*b*, idler shafts 181*a* and 181*b*, and a link shaft 191. The idler shafts 181*a* and 181*b* and the link shaft 191 are included in the auxiliary mechanism 8.

The crawler 11 is also called a crawler, and is formed of metal or rubber. The crawler 11 is stretched around the drive wheel 13 and the track rollers 15*a* and 15*b*. While moving in a direction in which the drive wheel 13 rotates, the crawler 11 causes the track rollers 15*a* and 15*b* to be driven to rotate the crawler-type traveling body 10. In addition, the crawler 11 has a plurality of protrusions 111*a* and 111*b* on surfaces thereof. The protrusions 111*a* on an outer side of the crawler 11 are provided so as to, for example, stably run over a small obstacle such as a stone on a road surface. The protrusions 111*b* on an inner side are provided so as to, for example, prevent the crawler 11 from falling off the drive wheel 13 or the track rollers 15*a* and 15*b*.

The drive wheel 13 transmits, to the crawler 11, a driving force for rotating the crawler-type traveling body 10. The crawler-type traveling body 10 transmits a driving force (rotative force) transmitted from the in-wheel motor 14 to the drive wheel 13, to the track rollers 15*a* and 15*b* via the crawler 11.

The in-wheel motor 14 is built into the drive wheel 13, and transmits a rotative force to the drive wheel 13. The in-wheel motor 14 is rotationally driven around the motor shaft 141 serving as a drive shaft. A rotation shaft (motor shaft 141) of the in-wheel motor 14 serves as a rotation shaft (drive shaft) of the drive wheel 13. Thus, the drive wheel 13 is rotated by the rotative force of the in-wheel motor 14. Then, the rotative force of the in-wheel motor 14 is transmitted as a driving force to the crawler 11. Specifically, the in-wheel motor 14 causes the drive wheel 13 to rotate in the positive direction so as to cause the traveling apparatus 1 to move forward, or to rotate in the negative direction so as to cause the traveling apparatus 1 to move backward.

Since the in-wheel motor 14 is built into the drive wheel 13, it is possible to simplify the structure of the in-wheel motor 14 such that, for example, parts such as a drive chain or a gear are not used. As a result, the risk of failure or the like to be caused by these parts can be reduced. Furthermore, since the in-wheel motor 14 is built into the drive wheel 13, it is possible to apply a driving force in the vicinity of the outer circumference of the crawler-type traveling body 10. It is thus possible to increase torque.

The track rollers 15*a* and 15*b* are rotatably attached to the crawler-type traveling body 10. The driving force (rotative force) transmitted from the drive wheel 13 via the crawler 11 causes the track rollers 15*a* and 15*b* to rotate around the track roller shafts 161*a* and 161*b* as rotation shafts, respectively.

Here, the drive wheel 13, the track roller 15*a*, and the track roller 15*b* form a triangle in a side view. The crawler 11 is stretched around the drive wheel 13, the track roller 15*a*, and the track roller 15*b*. The crawler 11 located between the track roller 15*a* and the track roller 15*b* is in contact with the ground. That is, the drive wheel 13 with the (built-in) in-wheel motor 14 does not come into contact with the road surface. As a result, even when, for example, the crawler-type traveling body 10 runs through a puddle, the in-wheel motor 14 does not soak in water. Thus, it is not necessary to provide a special waterproofing mechanism for the in-wheel motor 14.

As illustrated in FIG. 5, the diameter of the drive wheel 13 is different from the diameters of the track rollers 15*a* and 15*b*. It is necessary to design a layout of the traveling body in consideration of factors such as required limitation on size and required traveling performance. In general, torque per unit width in the thickness (width) of a motor tends to decrease as the diameter of the motor decreases. Therefore, a drive wheel with a built-in in-wheel motor needs to have a diameter equal to or larger than a motor diameter that allows required torque performance to be achieved. Therefore, the layout of the crawler-type traveling body 10 is designed such that the diameter of the drive wheel 13 installed in an upper part of the crawler-type traveling body 10 is larger than the diameters of the track rollers 15*a* and 15*b* so as to meet requirements about the size of the traveling apparatus 1 or the crawler-type traveling body 10 and also achieve the required traveling performance. If the diameters of track rollers are also increased within size limitations, the ground contact area of the traveling body is reduced. As a result, traveling stability of the traveling body is impaired. Therefore, the crawler-type traveling body 10 is also advantageous in that the track rollers 15*a* and 15*b* each having a relatively small diameter have been adopted in consideration of the diameter of the drive wheel 13.

The auxiliary mechanism 8 includes auxiliary wheels (idlers 18*a* and 18*b*) that rotate in accordance with the move of the crawler 11. The auxiliary wheels (idlers 18*a* and 18*b*) are provided such that the auxiliary wheels (idlers 18*a* and 18*b*) can swing around the link shaft 191 (swing shaft). The auxiliary mechanism 8 is also referred to as, for example, a swing mechanism, a balance-type auxiliary mechanism, a balance-type swing mechanism, a balance-type swing wheel, or a balance-type swing track roller. The auxiliary mechanism 8 is provided at the base of the triangle formed by the drive wheel 13 and the track rollers 15*a* and 15*b* in a side view.

The auxiliary mechanism 8 includes the idlers 18*a* and 18*b* and the link 19. The idlers 18*a* and 18*b* are auxiliary wheels that are provided between the two track rollers 15*a* and 15*b* and rotate in accordance with the move of the crawler 11. The idlers 18*a* and 18*b* rotate around the idler shafts 181*a* and 181*b* as rotation shafts, respectively. The link 19 is a support that supports the idler 18*a* and the idler 18*b*.

The side plates 20*a* and 20*b* support the drive wheel 13, the track rollers 15*a* and 15*b*, and the auxiliary mechanism 8 in the crawler-type traveling body 10. The crawler-type traveling body has a double-sided structure (double-supported structure) that supports the drive wheel 13, the track rollers 15*a* and 15*b*, and the auxiliary mechanism 8 by means of the two side plates 20*a* and 20*b*. The two side plates 20*a* and 20*b* are supported by the plurality of side-plate supports 27*a*, 27*b*, 27*c*, and 27*d*. The side plates 20*a* and 20*b* support the drive wheel 13 by means of the motor shaft 141. The side plates 20*a* and 20*b* support the track roller 15*a* by means of the track roller shaft 161*a*, and also support the track roller 15*b* by means of the track roller shaft 161*b*. Furthermore, the side plates 20*a* and 20*b* support the auxiliary mechanism 8 via the link shaft 191 of the link 19 that supports the idlers 18*a* and 18*b*.

The tensioner 25 is formed of an elastic member such as a spring, and is coupled to the in-wheel motor 14 and the motor shaft 141 that is a rotation shaft of the drive wheel 13. The tensioner is installed such that the drive wheel 13 is pressed against the inside of the crawler 11, and applies tension to the crawler 11. The tensioner 25 plays a role of adjusting tension to be applied by the drive wheel 13 to the crawler 11 during traveling. The tensioner 25 plays a role of keeping tension at a substantially constant level during traveling such that, for example, a reference tension is constantly applied during traveling by using, as the reference tension, a tension applied to the crawler-type traveling body 10 at rest. Furthermore, the crawler-type traveling body 10 adjusts slack of the crawler 11 by means of the tensioner 25 to maintain normal transmission of driving force from the crawler 11. Furthermore, the crawler-type traveling body 10 can prevent the crawler 11 from falling off, by applying tension to the crawler 11 by means of the tensioner 25.

Here, as illustrated in FIGS. 4 and 5, the crawler-type traveling body 10 has a structure that is substantially symmetric with respect to the drive wheel 13 in front and rear in a traveling direction. More specifically, the crawler-type traveling body 10 has a structure that is substantially symmetric with respect to a perpendicular line extending from the motor shaft 141 of the in-wheel motor 14 that is perpendicular to a straight line connecting the shafts of the two track rollers 15*a* and 15*b* in a side view from an X-axis direction as illustrated in FIGS. 4 and 5. That is, the first auxiliary wheel is opposite to the second auxiliary wheel across the perpendicular line.

For example, a traveling apparatus that travels in a narrow space needs to frequently move forward and backward and perform a spin turn. In this case, if the shape of the crawler or the arrangement of the drive wheel, the track rollers, the tensioner, or the like is asymmetric in a front-back direction, there may be a case where drive performance may differ between forward and backward movements, or a case where the traveling apparatus cannot rotate around its center when performing a spin turn. Therefore, the layout (structure) of the crawler-type traveling body 10 is made substantially symmetric in the front-back direction. Thus, it is possible to improve the stability of the traveling apparatus 1 during traveling and simplify control. In addition, since it is possible to install the crawler-type traveling body 10 without distinguishing right and left of the traveling apparatus 1, the number of parts can be reduced.

[Configuration of Tensioner]

Next, a detailed configuration of the tensioner 25 included in the crawler-type traveling body will be described with reference to FIGS. 6A, 6B, 7 and 8. FIG. 6A is a side view of the tensioner installed in the crawler-type traveling body, in which an example of the configuration of the tensioner is illustrated. The tensioner 25 is coupled to the motor shaft 141 of the in-wheel motor 14. The tensioner 25 presses the drive wheel 13 against the crawler 11 to apply tension to the crawler 11. FIG. 6A illustrates a state in which the tensioner 25 attached to the side plate 20 is covered with an exterior portion 259. The tensioner 25 is coupled to the motor shaft 141 of the in-wheel motor 14 built into the drive wheel 13.

Figure 6B:
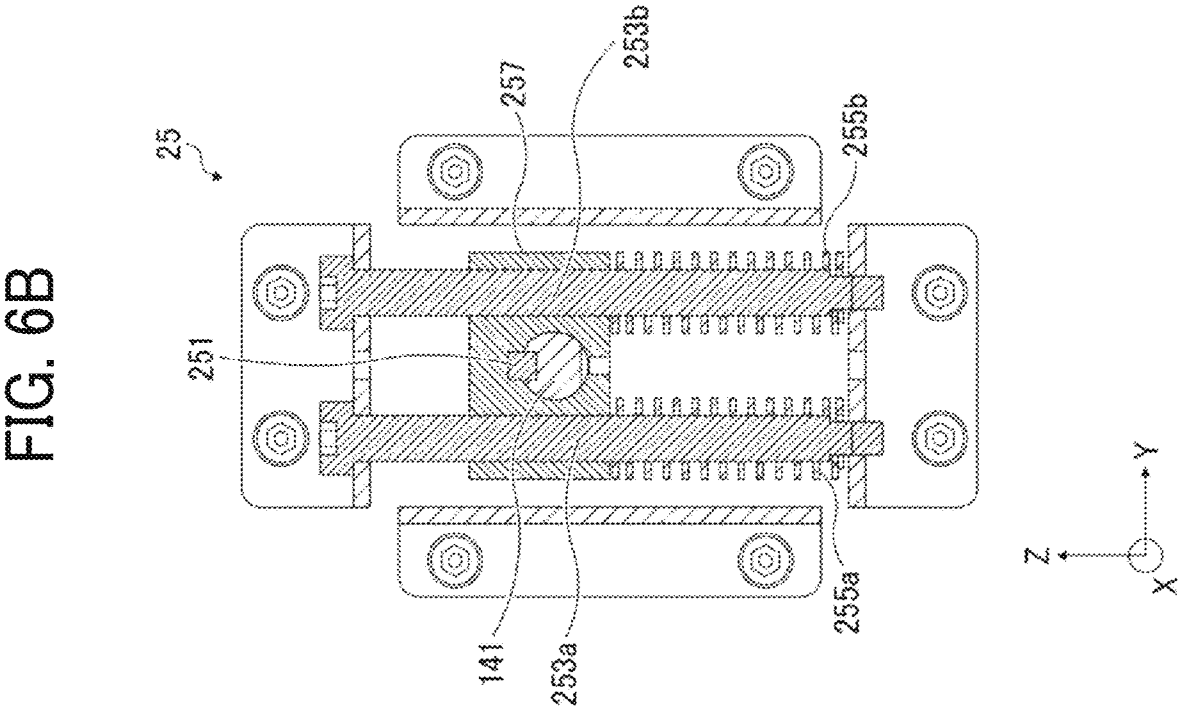
FIGS. 6A and 6B are diagrams showing an example of a configuration of a tensioner included in the crawler-type traveling body.
Figure 6A:
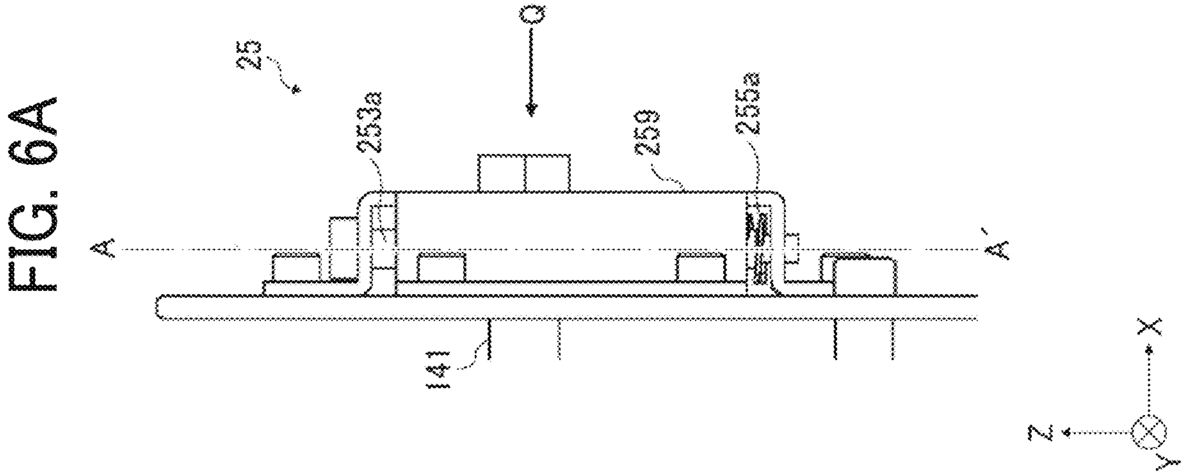
Figure 7:
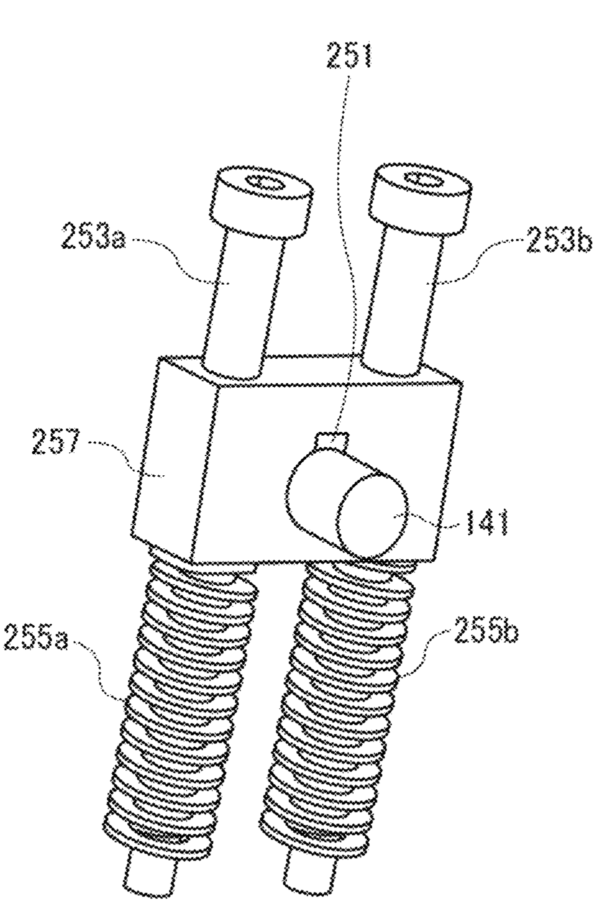
FIG. 7 is a perspective view of the tensioner, in which an example of a detailed configuration of the tensioner is shown.

FIG. 6B is a cross-sectional view of the tensioner taken along line AA' (taken in the direction of arrow Q). FIG. 7 is a perspective view of the tensioner, in which an example of the detailed configuration of the tensioner is illustrated. The tensioner 25 includes a securing portion 251, shanks 253*a* and 253*b*, elastic bodies 255*a* and 255*b*, and a block 257.

The securing portion 251 is a member for securing the drive wheel 13 to the motor shaft 141 which is a rotation shaft of the in-wheel motor 14. The tensioner 25 secures the block 257 to the motor shaft 141 by means of the securing portion 251 to prevent rotation of the motor shaft 141.

The shanks 253*a* and 253*b* are members serving as guides for elastic deformation of the elastic bodies 255*a* and 255*b*, respectively. The elastic bodies 255*a* and 255*b* are elastic members such as springs provided along the shanks 253*a* and 253*b*, respectively. The elastic bodies 255*a* and 255*b* are elastically deformed in a vertical direction while guided by the shanks 253*a* and 253*b*, respectively.

The block 257 plays a role of coupling the tensioner 25 to the motor shaft 141 penetrating the block 257. The block 257 slides in an axial direction along the shanks 253*a* and 253*b* penetrating the block 257. Accordingly, the tensioner 25 can cause the drive wheel 13 to move vertically along a vertical line passing through a center of the motor shaft 141 in conjunction with deformation of the elastic bodies 255*a* and 255*b*. Thus, the crawler-type traveling body causes the motor shaft 141 to be pushed up due to deformation of the elastic bodies 255*a* and 255*b*. As a result, the crawler-type traveling body 10 presses the drive wheel 13 itself as a tensioner against the crawler 11 to apply tension to the crawler 11. Instead of the elastic bodies 255*a* and 255*b*, the tensioner 25 may include a member or mechanism that can expand and contract in the vertical direction so as to cause the drive wheel 13 to move in the vertical direction.

Figure 8:
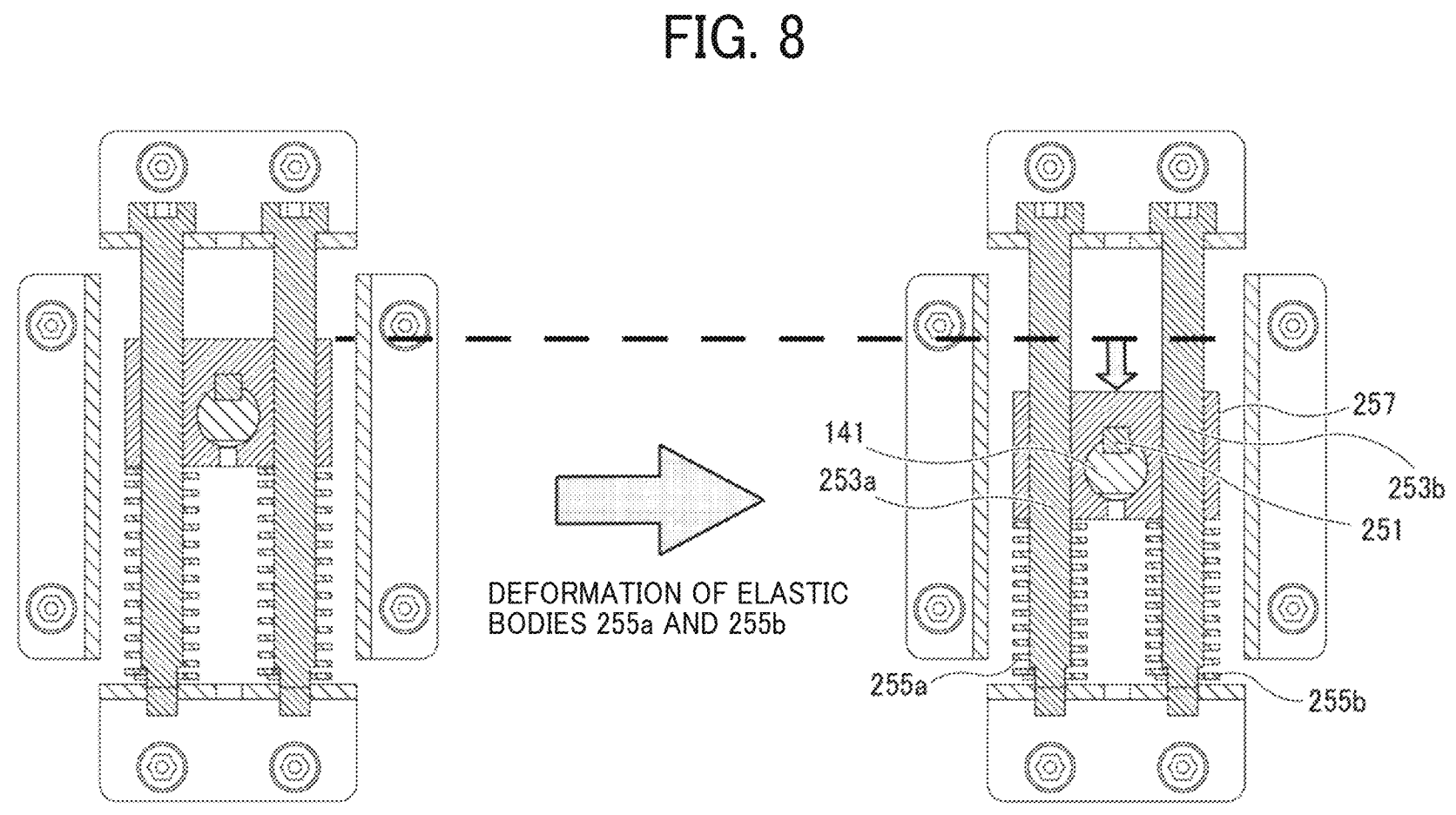

FIG. 8 is a diagram for describing a change in a state of the tensioner. As illustrated in FIG. 8, the elastic bodies 255*a* and 255*b* expand and contract as a result of being deformed by pressure applied to the drive wheel 13 from above. In the tensioner 25 illustrated in the left diagram of FIG. 8 (same as FIG. 6B), the elastic bodies 255*a* and 255*b* are expanded to apply tension to the crawler 11. Meanwhile, the right diagram of FIG. 8 illustrates a state of the tensioner 25 in which the elastic bodies 255*a* and 255*b* are contracted by pressure applied from above. For example, when the crawler 11 is pressed against an obstacle or the like on a road surface during traveling, the crawler-type traveling body 10 can reduce damage to the crawler 11 by contracting the elastic bodies 255*a* and 255*b* to reduce tension to be applied to the crawler 11.

Here, in a crawler-type traveling body having a triangular shape in which a drive wheel with a built-in in-wheel motor is disposed in an upper part of the crawler-type traveling body, it is necessary to increase the diameter of the in-wheel motor so as to increase the torque of the motor. In general, a motor is heavy in weight. Therefore, when the diameter of the motor is increased, the weight of the motor further increases. This heightens the center of gravity of the traveling body including the drive wheel disposed in the upper part, leading to a decrease in traveling stability. In addition, a conventional crawler-type traveling body having a triangular shape is equipped with a tensioner that is separately provided so as to prevent a wheel from falling off. The tensioner needs to be placed in a position that allows a crawler to freely move together with the tensioner so as to absorb fluctuations in tension. Therefore, the tensioner is placed in an upper part of the crawler-type traveling body having a triangular shape. As a result, the drive wheel is placed at a higher position so as to ensure a space for providing the tensioner.

Therefore, in the crawler-type traveling body 10, the tensioner 25 is coupled to the rotation shaft (motor shaft 141) of the drive wheel 13 to cause the drive wheel 13 itself to function as a tensioner. This eliminates a space for installation of the tensioner. Therefore, the drive wheel 13 can be disposed at a lower position in the crawler-type traveling body 10, leading to an improvement in traveling stability.

[Configurations of Side Plates]

Figure 9B:
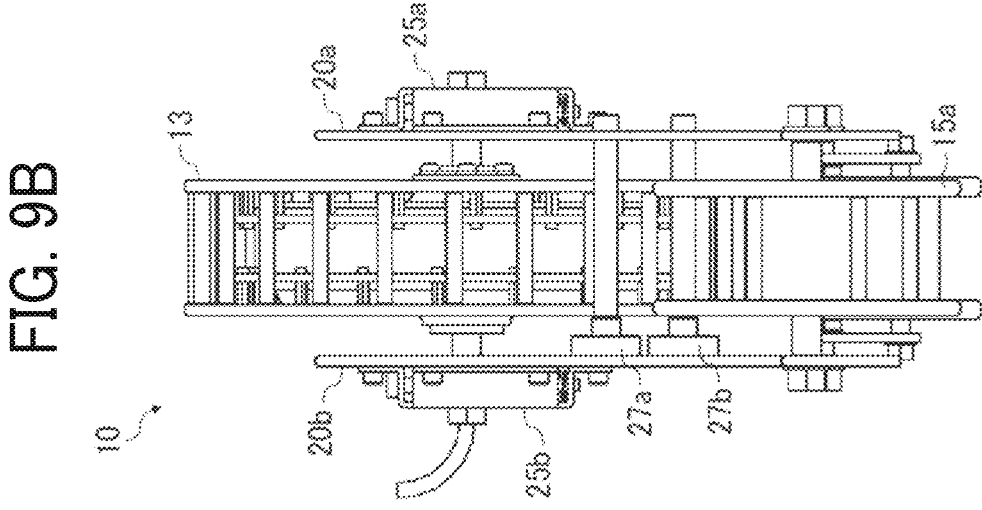
FIGS. 9A and 9B are diagrams showing an example of configurations of side plates included in the crawler-type traveling body.
Figure 9A:
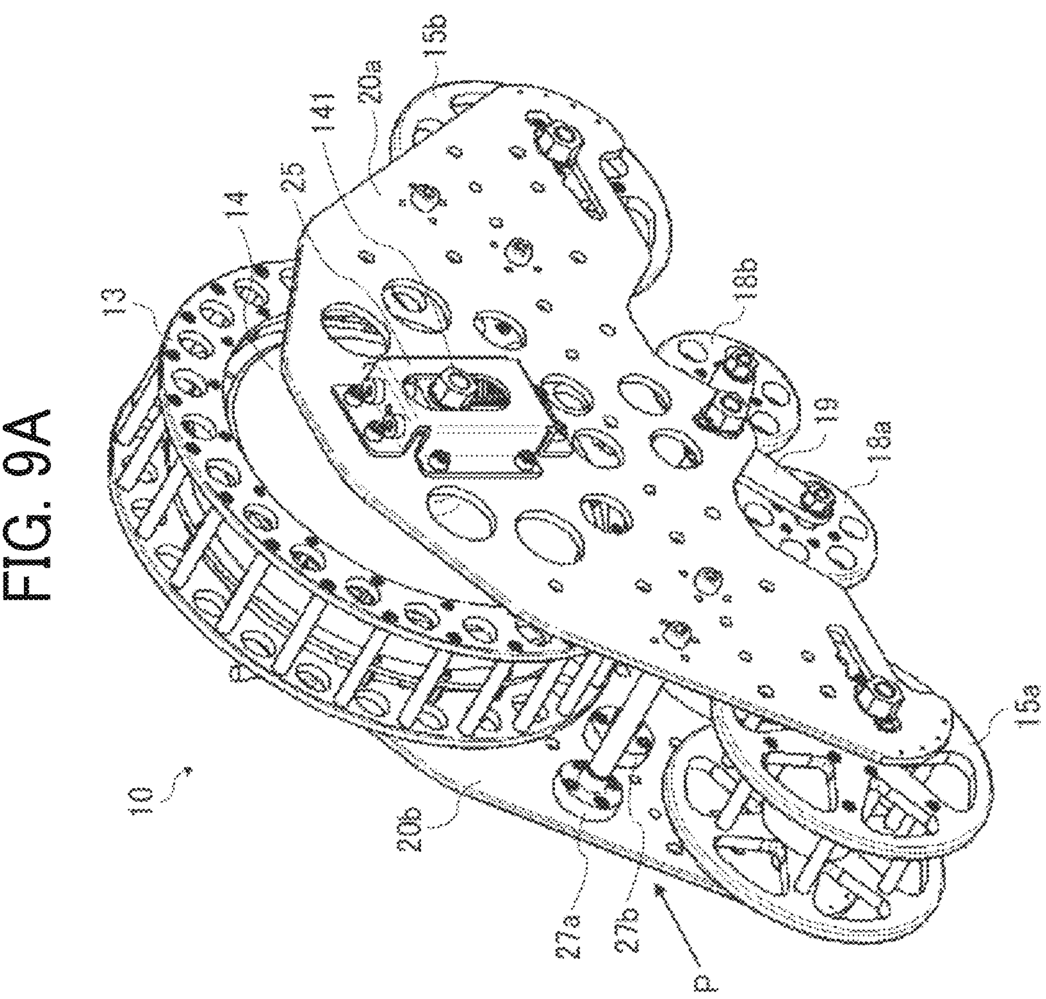

Next, detailed configurations of the side plates 20*a* and 20*b* included in the crawler-type traveling body 10 will be described with reference to FIGS. 9A, 9B, 10, and 11. FIGS. 9A and 9B are diagrams showing an example of configurations of the side plates included in the crawler-type traveling body. FIG. 9A is an external perspective view of the crawler-type traveling body 10 from which the crawler 11 has been removed. FIG. 9B is a side view (taken in the direction of arrow P) of the crawler-type traveling body 10 from which the crawler 11 has been removed. The drive wheel 13, the track rollers 15*a* and 15*b*, and the link 19 coupling the idler 18*a* and the idler 18*b* are coupled by the two side plates 20*a* and 20*b*. The two side plates 20*a* and 20*b* are coupled by the plurality of side-plate supports 27*a*, 27*b*, 27*c*, and 27*d*. The drive wheel 13, the track rollers 15*a* and 15*b*, and the link 19 coupling the idler 18*a* and the idler 18*b* are supported by the two side plates 20*a* and 20*b* with the double-sided structure (double-supported structure). The number of the side-plate supports is not limited thereto.

As described above, the crawler-type traveling body 10 supports the respective axle shafts (the motor shaft 141 and the track roller shafts 161*a* and 161*b*) of the drive wheel 13 and the track rollers 15*a* and 15*b* with the double-sided structure (double-supported structure) including the two side plates 20*a* and 20*b*. The in-wheel motor 14 built into the drive wheel 13 is large and heavy. In addition, the tensioner 25 is coupled to the motor shaft 141. Thus, it is necessary to separately provide a large arm (support) when adopting a structure in which the drive wheel and the track rollers are supported in a cantilevered manner. Therefore, the drive wheel 13 and the track rollers 15*a* and 15*b* are supported with the double-sided structure (double-supported structure) including the side plates 20*a* and 20*b*. As a result, the crawler-type traveling body 10 can stably apply tension to the crawler 11 with a compact structure. In addition, all the wheels including the idlers 18*a* and 18*b* in the crawler-type traveling body 10 are held at both ends by the side plates 20*a* and 20*b*. Thus, the layout (structure) can be simplified and robust. Furthermore, the crawler-type traveling body 10 can obtain high rigidity by supporting the axle shaft of each wheel by means of the side plates 20*a* and 20*b* in a double-sided manner (double-supported manner).

Figure 10:
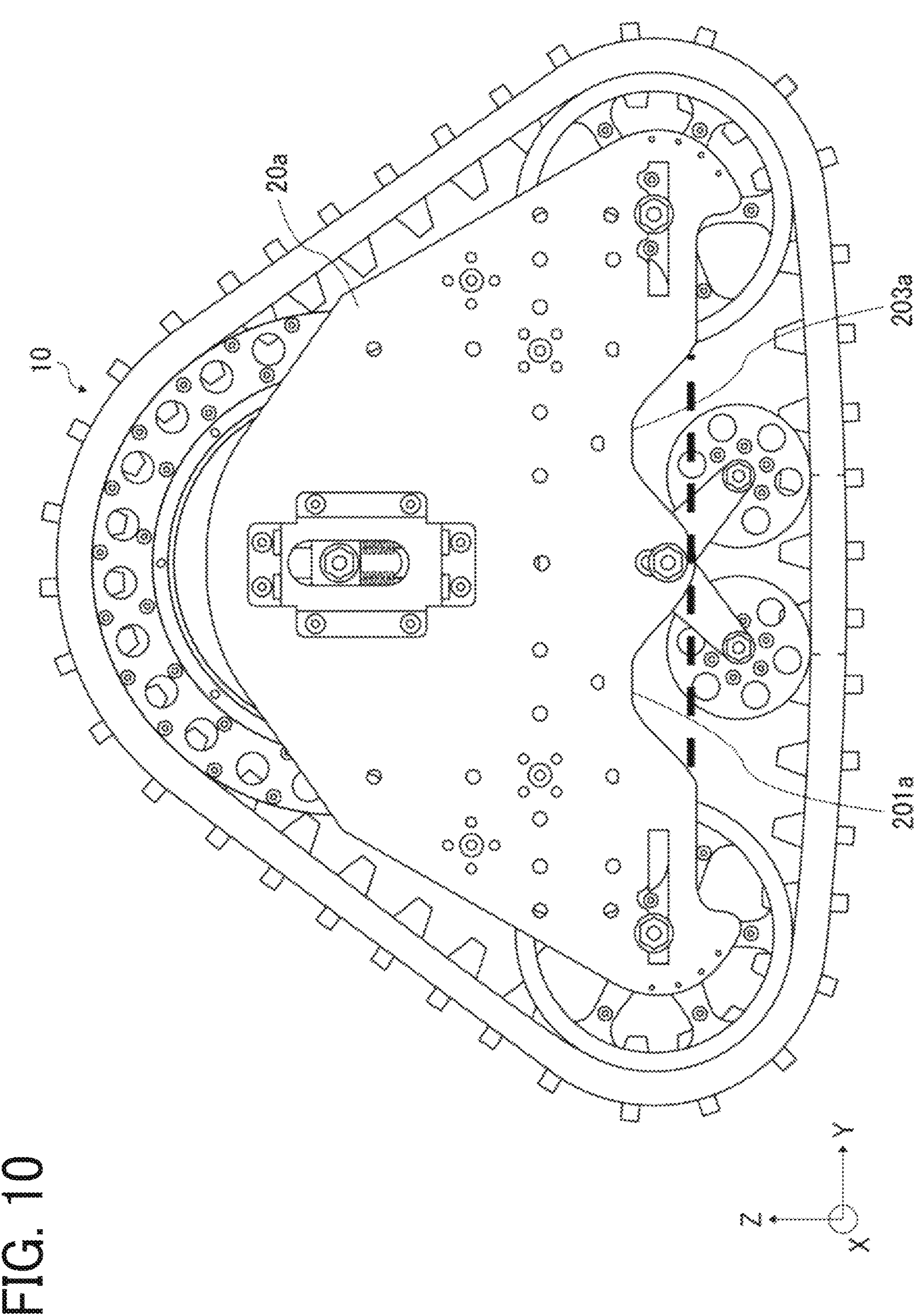
FIG. 10 is a diagram for describing characteristics of the side plates included in the crawler-type traveling body.

Characteristics of the side plates 20*a* and 20*b* included in the crawler-type traveling body 10 will be described with reference to FIGS. 10 and 11. Since the side plates 20*a* and 20*b* illustrated in FIG. 10 have the same structure, characteristics of the side plate 20*a* will be described in FIGS. 10 and 11. As illustrated in FIG. 10, the side plate 20*a* has cut-away portions 201*a* and 203*a*. The cut-away portions 201*a* and 203*a* refer to portions cut away from the side plate 20*a* on the ground contact surface side (bottom surface side) of the crawler 11. The crawler-type traveling body 10 has the double-sided structure (double-supported structure) including the two side plates 20*a* and 20*b* as described above. Thus, there is a high possibility that a foreign substance such as a tree branch or a stone is caught between a wheel and the side plate, and the wheel may be locked. Therefore, the cut-away portions 201*a* and 203*a* are provided in the side plate 20*a* so that the idlers 18*a* and 18*b* are not covered with the side plate 20*a*. As a result, it is possible to prevent entry of a foreign substance into a gap between the side plate 20*a* and the idlers 18*a* and 18*b* in the crawler-type traveling body 10. Note that the shape and number of the cut-away portions 201*a* and 203*a* are not limited thereto. For example, cut-away portions may be provided in the side plate 20*a* such that the track rollers 15*a* and 15*b* are partially uncovered.

Figure 11:
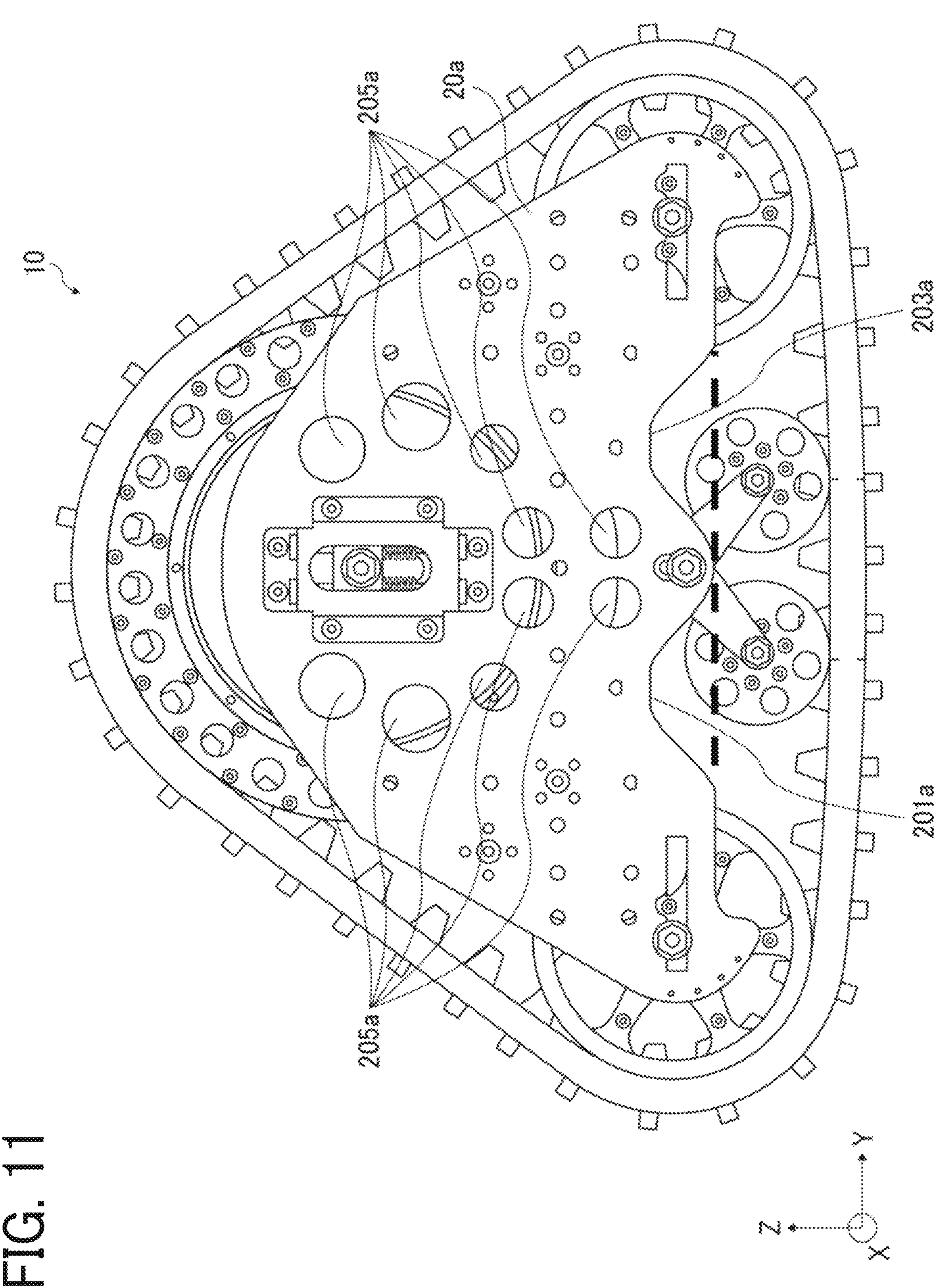
FIG. 11 is a diagram for describing characteristics of the side plates included in the crawler-type traveling body.

In addition, as illustrated in FIG. 11, the side plate 20*a* has a plurality of side-plate holes 205*a* so that a foreign substance having entered a gap between each wheel and the side plate 20*a* is smoothly discharged. Accordingly, the crawler-type traveling body 10 can prevent a failure to be caused by a foreign substance having entered a gap between each wheel and the side plate 20*a*. The side-plate holes 205*a* provided in the side plate 20*a* allow the weight of the crawler-type traveling body 10 to be reduced, and also allow the state of the inside of the crawler-type traveling body 10 to be visually checked by a user. Furthermore, the side-plate holes 205*a* provided in the side plate 20*a* also allow, for example, various types of wiring in the traveling apparatus 1 to be performed through the side-plate holes 205*a*. The number or shape of the side-plate holes 205*a* is not limited to the example illustrated in FIG. 11.

[Configurations of Drive Wheel and Track Rollers]

Next, detailed configurations of the drive wheel 13 and the track rollers 15 included in the crawler-type traveling body 10 will be described with reference to FIGS. 12A to 12C, 13A to 13C, and 14. First, the configuration of the drive wheel 13 will be described with reference to FIGS. 12A to 12C. FIG. 12A is an external perspective view of the drive wheel. FIG. 12B is a front view (taken in the direction of arrow P) of the drive wheel viewed in a traveling direction.

The drive wheel 13 includes a sprocket 131 having a function of transmitting rotation of the in-wheel motor 14 to the crawler 11. The drive wheel 13 also includes the in-wheel motor 14 secured inside. The sprocket 131 as the drive wheel 13 rotates around the motor shaft 141 as a rotation shaft (drive shaft) in conjunction with rotation of the in-wheel motor 14. The sprocket 131 is formed in such a way as to couple a wheel 132 and a wheel 134 via coupling members 136. The coupling members 136 are provided between the wheels 132 and 134 at regular intervals along outer circumferences of the wheels 132 and 134. The protrusions 111*b* provided on the inner side of the crawler 11 rotate as the protrusions 111*b* enter gaps between adjacent coupling members 136 of the sprocket 131. Therefore, the crawler-type traveling body 10 can produce a more reliable drive transmission effect between the crawler 11 and the drive wheel 13. Furthermore, the drive wheel 13 includes a plurality of support members 138 that causes the sprocket 131 to support the in-wheel motor 14. It is possible to change the width of the in-wheel motor 14 to be built into the drive wheel 13 by changing the lengths of the support members 138.

The drive wheel 13 also includes a main-body cable 143 for coupling the motor shaft 141 of the in-wheel motor 14 to the main body 50. The motor shaft 141 of the in-wheel motor 14 is a cylinder. The main-body cable 143 passes through the motor shaft 141, and couples the in-wheel motor 14 to the main body 50. The drive wheel 13 receives power supply from the battery 530 provided in the main body 50 via the main-body cable 143.

Figure 12C:
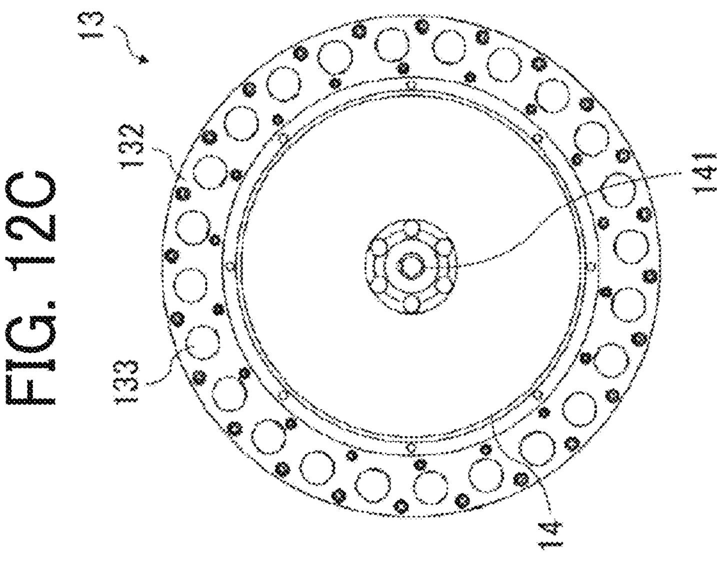
FIGS. 12A to 12C are diagrams showing an example of a configuration of a drive wheel provided in the crawler-type traveling body.
Figure 12B:
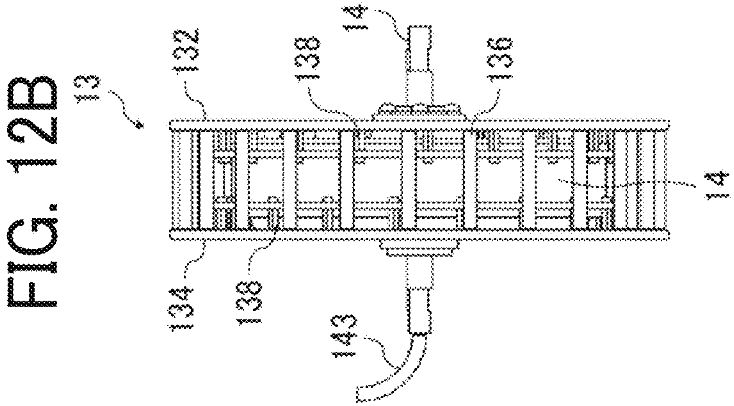
Figure 12A:
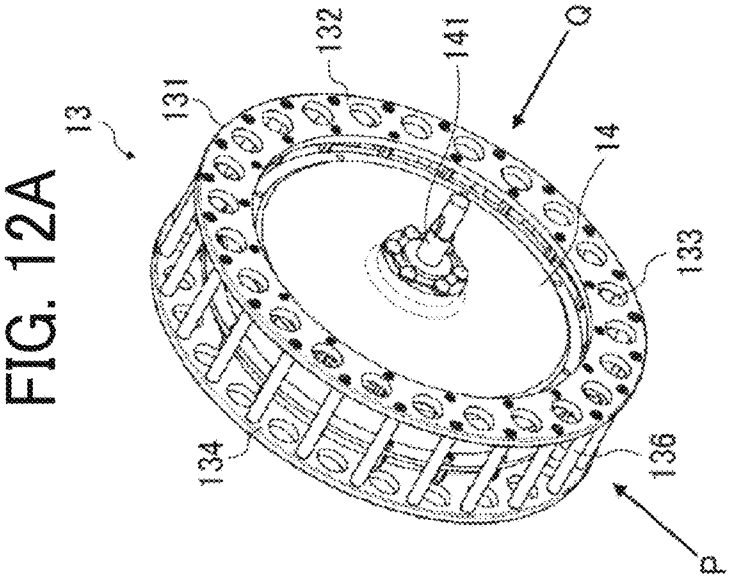

FIG. 12C is a side view (taken in the direction of arrow Q) of the drive wheel viewed in the traveling direction. In a crawler-type traveling body, when a foreign substance such as mud, earth and sand, or dust enters a gap between a drive wheel and a crawler, rotation of the drive wheel may be locked, or the crawler may fall off. Therefore, the wheel 132 of the drive wheel 13 has a plurality of wheel holes 133 so as to prevent entry of a foreign substance. As a result, the drive wheel 13 has a structure in which a foreign substance having entered a gap between the drive wheel 13 and the crawler 11 or having entered the sprocket 131 is smoothly discharged. The number or shape of the wheel holes 133 is not limited to the example illustrated in FIG. 12C. The wheel 134 has the same configuration as the wheel 132.

Next, configurations of the track rollers 15*a* and 15*b* will be described with reference to FIGS. 13A to 13C and 14. The track rollers 15*a* and 15*b* have the same configuration. Thus, the configuration of the track roller 15*a* will be described in FIGS. 13A to 13C and 14. FIG. 13A is an external perspective view of the track roller. FIG. 13B is a front view (taken in the direction of arrow P) of the track roller viewed in the traveling direction.

The track roller 15*a* is formed in such a way as to couple a wheel 152*a* and a wheel 154*a* via a shaft section 151*a*. The track roller 15*a* includes coupling members 156*a* provided between the wheels 152*a* and 154*a* at regular intervals along outer circumferences of the wheels 152*a* and 154*a*. The coupling members 156*a* are provided between the wheels 152*a* and 154*a* at regular intervals along the outer circumferences of the wheels 152*a* and 154*a*. The protrusions 111*b* provided on the inner side of the crawler 11 rotate as the protrusions 111*b* enter gaps between adjacent coupling members 156*a*. Therefore, the crawler-type traveling body 10 can prevent the crawler 11 from falling off and also prevent the track roller 15*a* from falling off the crawler 11.

FIG. 13C is a side view (taken in the direction of arrow Q) of the track roller viewed in the traveling direction. As with the drive wheel 13, the wheel 152*a* of the track roller 15*a* has a plurality of wheel holes 153*a* so as to prevent entry of a foreign substance. As a result, the track roller 15*a* has a structure in which a foreign substance having entered a gap between the track roller 15*a* and the crawler 11 is smoothly discharged. The number or shape of the wheel holes 153*a* is not limited to the example illustrated in FIG. 13C. The wheel 154*a* has the same configuration as the wheel 152*a*.

Figure 14:
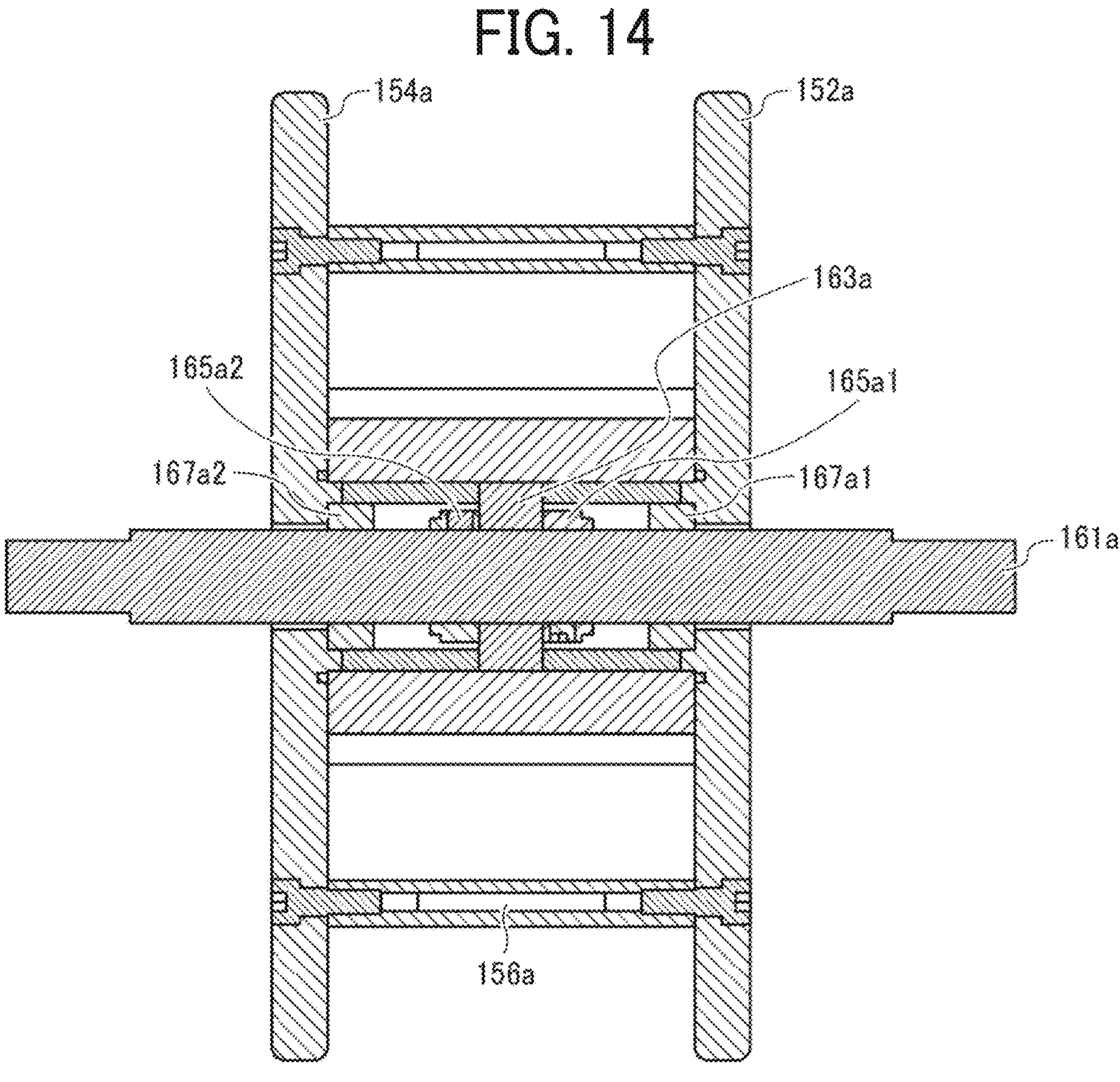
FIG. 14 is a diagram showing an example of an internal structure of a shaft section in the track roller.

Next, a cross-sectional structure of the shaft section 151*a* viewed in the traveling direction (P direction) of the track roller 15*a* will be described with reference to FIG. 14. FIG. 14 is a diagram showing an example of an internal structure of the shaft section in the track roller. In addition to the constituent elements illustrated in FIGS. 13A to 13C, the track roller 15*a* includes the shaft section 151*a* including the track roller shaft 161*a* serving as a rotation shaft of the track roller, a bearing 163*a*, set collars 165*a*1 and 165*a*2, and oil seals 167*a*1 and 167*a*2.

The track roller 15*a* includes the single bearing 163*a* located at the center of the track roller shaft 161*a* in the shaft section 151*a*. This configuration in which the single bearing 163*a* is simply disposed can achieve reduction in the number of parts of the crawler-type traveling body and also achieve reduction in the cost of the crawler-type traveling body 10.

In addition, the track roller 15*a* includes the two set collars 165*a*1 and 165*a*2 that hold the bearing 163*a*. The set collars 165*a*1 and 165*a*2 are disposed such that the bearing 163*a* disposed at the center of the track roller shaft 161*a* is sandwiched between the set collars 165*a*1 and 165*a*2 in the shaft section 151*a*. Accordingly, it is possible to facilitate an offset of the wheels 152*a* and 154*a* with respect to the track roller shaft 161*a* in the crawler-type traveling body 10.

Furthermore, the track roller 15*a* includes the oil seals 167*a*1 and 167*a*2 located on the inner side of the wheels 152*a* and 154*a*, respectively. As a result, the crawler-type traveling body 10 can protect the bearing 163*a* in the shaft section 151*a* from a foreign substance such as water or dust that enters from the outside.

[Configuration of Auxiliary Mechanism]

Figures 15, 16:
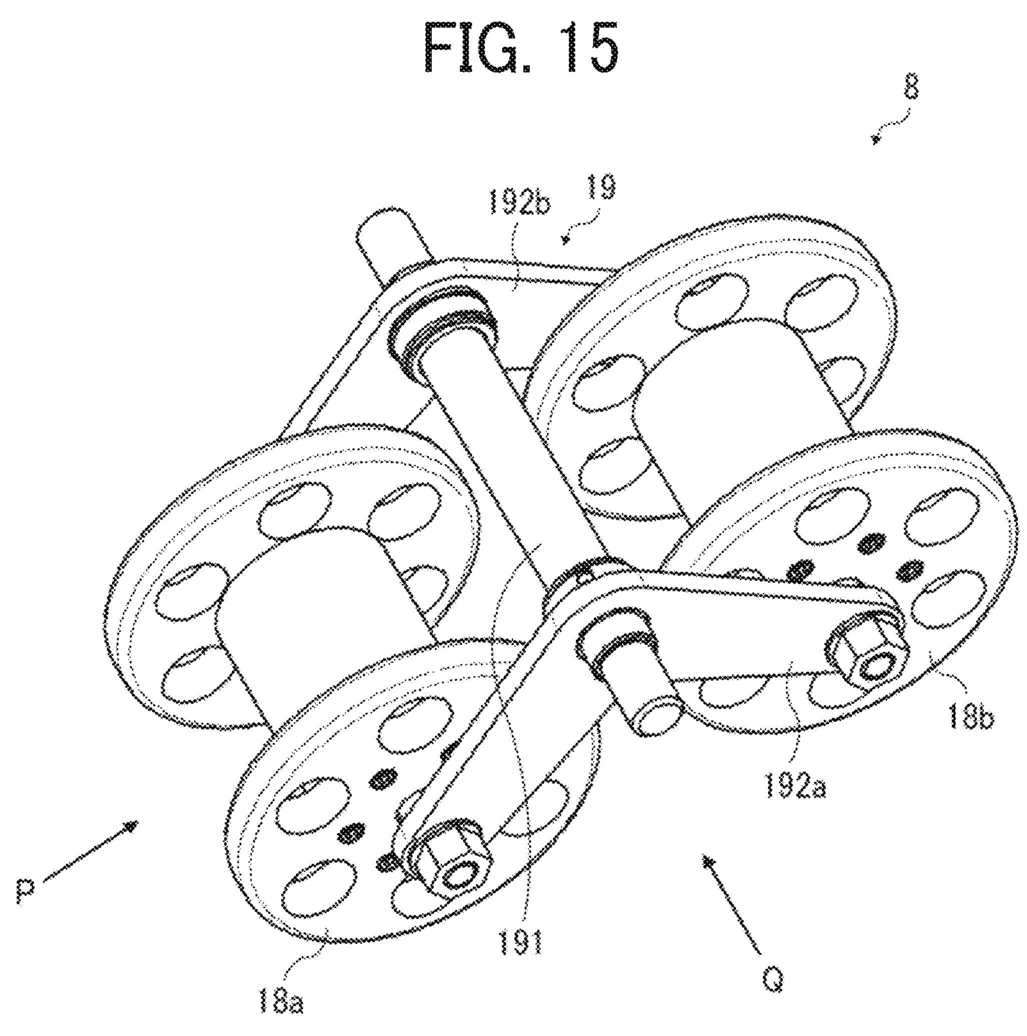
FIG. 15 is a diagram showing an example of a configuration of an auxiliary mechanism.
FIG. 16 is a diagram showing an example of an internal structure of a link.

Next, a configuration of the auxiliary mechanism 8 included in the crawler-type traveling body 10 will be described with reference to FIGS. 15, 16, and 17A to 17C. FIG. 15 is a diagram showing an example of the configuration of the auxiliary mechanism. As illustrated in FIG. 15, the auxiliary mechanism 8 includes the link 19 and the two idlers 18*a* and 18*b* coupled by the link 19. The link 19 is a support that supports the plurality of idlers 18. The idlers 18*a* and 18*b* are coupled by two link plates 192*a* and 192*b*. The two link plates 192*a* and 192*b* are 50 coupled by the link shaft 191. The link 19 supports the idlers 18*a* and 18*b* with a double-sided structure (double-supported structure) by means of the two link plates 192*a* and 192*b*. As illustrated in, for example, FIG. 4, the auxiliary mechanism 8 is supported and secured to the side plates 20*a* and 20*b* by use of the two link plates 192*a* and 192*b* and the link shaft 191 of the link 19. The idlers 18*a* and 18*b* are examples of an auxiliary wheel. The link 19 is an example of a coupler. The link shaft 191 is an example of a swing shaft. The link plates 192*a* and 192*b* are examples of a swing portion.

Next, a cross-sectional structure of the link 19 viewed in the traveling direction (P direction) of the auxiliary mechanism 8 will be described with reference to FIG. 16. FIG. 16 is a diagram showing an example of an internal structure of the link. The link 19 includes set collars 193*a* and 193*b* and bush members 195*a* and 195*b* in addition to the constituent elements illustrated in FIG. 15.

The link 19 includes the set collars 193*a* and 193*b* that are located on the inner side of the link plates 192*a* and 192*b* and hold the link plates 192*a* and 192*b*, respectively. Accordingly, in the crawler-type traveling body 10, it is possible to facilitate an offset with respect to the link shaft 191 by securing the link plates 192*a* and 192*b* by means of the set collars 193*a* and 193*b*, respectively.

The link 19 includes the bush members 195*a* and 195*b*, such as a bush nut, located at junctions between the link shaft 191 and the link plates 192*a* and 192*b*, respectively. As a result, the crawler-type traveling body 10 allows the link plates 192*a* and 192*b* to smoothly swing and rotate around the link shaft 191.

FIGS. 17A to 17C are diagrams showing an example of a configuration of the idler. The idlers 18*a* and 18*b* illustrated in FIG. 15 have the same configuration. Therefore, the configuration of the idler 18*a* will be described as a representative in FIGS. 17A to 17C. FIG. 17A is an external perspective view of the idler. FIG. 17B is a front view (taken in the direction of arrow P) of the idler viewed in the traveling direction. As illustrated in FIGS. 17A and 17B, the idler 18*a* is formed in such a way as to couple a wheel 182*a* and a wheel 184*a* via the idler shaft 181*a*.

FIG. 17C is a side view (taken in the direction of arrow Q) of the idler viewed in the traveling direction. As illustrated in FIG. 17C, the wheel 182*a* of the idler 18*a* has a plurality of wheel holes 183*a* so as to prevent entry of a foreign substance, as with the track roller 15*a*. As a result, the idler 18*a* has a structure in which a foreign substance having entered a gap between the idler 18*a* and the crawler 11 is smoothly discharged. The number or shape of the wheel holes 183*a* is not limited to the example illustrated in FIG. 17C. The wheel 184*a* has the same configuration as the wheel 182*a*.

The idler 18*a* has a cross-sectional structure similar to the cross-sectional structure of the track roller 15*a* illustrated in FIG. 14. In addition to the constituent elements illustrated in FIGS. 17A to 17C, the idler 18*a* includes the idler shaft 181*a* including, for example, an axle shaft 171*a* serving as a rotation shaft of the idler 18*a*, a bearing 173*a*, set collars 175*a*1 and 175*a*2, and oil seals 177*a*1 and 177*a*2. The configurations of the axle shaft 171*a*, the bearing 173*a*, the set collars 175*a*1 and 175*a*2, and the oil seals 177*a*1 and 177*a*2 are similar to the configurations of the track roller shaft 161*a*, the bearing 163*a*, the set collars 165*a*1 and 165*a*2, and the oil seals 167*a*1 and 167*a*2 of the track roller 15*a* illustrated in FIG. 14, respectively. Thus, description thereof will be omitted.

Here, the diameters of the wheel holes provided in the idler 18, the drive wheel 13, and the track rollers 15*a* and 15*b* are preferably, for example, φ15 or more so as to smoothly discharge various foreign substances. The same applies to the side-plate holes 205*a* and 205*b* provided in the side plates 20*a* and 20*b*, respectively.

Here, the crawler-type traveling body 10 causes the crawler 11 to be driven by rotation of the drive wheel 13 with the (built-in) in-wheel motor 14. Then, the track rollers 15*a* and 15*b* are rotated by a rotative force transmitted from the crawler 11. In addition, the track rollers 15*a* and 15*b* are guided by the protrusions 111*b* provided on the inner side of the crawler 11, to rotate in conjunction with movement of the crawler 11. At this time, in a case where a distance between the track rollers 15*a* and 15*b* is large, the crawler 11 may fall off the track roller 15*a* or 15*b*. Therefore, the crawler-type traveling body 10 includes the auxiliary mechanism 8 that is located between the track rollers 15*a* and 15*b* and is in contact with the crawler 11. It is thus possible to prevent the crawler 11 from falling off. In addition, the crawler-type traveling body 10 includes the idlers 18*a* and 18*b* provided on a contact area of the crawler-type traveling body 10, in addition to the track rollers 15*a* and 15*b*. As a result, a load can be dispersed. It is thus possible to reduce the risk of occurrence of failure or the like.

It is possible to increase surface resistance by increasing the ground contact area of the crawler-type traveling body 10. Thus, traveling stability can be enhanced. Meanwhile, as the ground contact area of the crawler-type traveling body 10 decreases, surface resistance also decreases, but turning performance of the crawler-type traveling body 10 can be improved during traveling. Therefore, in particular, motion of a spin turn is easily performed by the traveling apparatus 1. In order to take advantage of such characteristics, the crawler-type traveling body 10 allows the height of the auxiliary mechanism 8 to be adjusted according to application purposes or usage environments, so as to make adjustment in such a way as to raise or lower positions at which the idlers 18*a* and 18*b* come into contact with the crawler 11.

Specifically, for example, when the traveling apparatus 1 is at rest, a worker changes the height of the link 19 that has been statically secured, to make adjustment in such a way as to raise or lower the heights of the idlers 18*a* and 18*b* of the crawler-type traveling body 10. Alternatively, the crawler-type traveling body 10 may be configured such that, for example, the height of the link 19 can be dynamically changed in response to a control signal from the position control motor driver 550. In this case, the traveling apparatus 1 adjusts the heights of the respective links 19 of the two crawler-type traveling bodies 10*a* and 10*b* by driving the position control motors 555*a* and 555*b* based on the control signal transmitted from the position control motor driver 550. The traveling apparatus 1 controls adjustment to the height of the link 19 according to, for example, the state of a road surface or traveling speed.

[Detailed Configuration of Auxiliary Mechanism]

Figure 18:
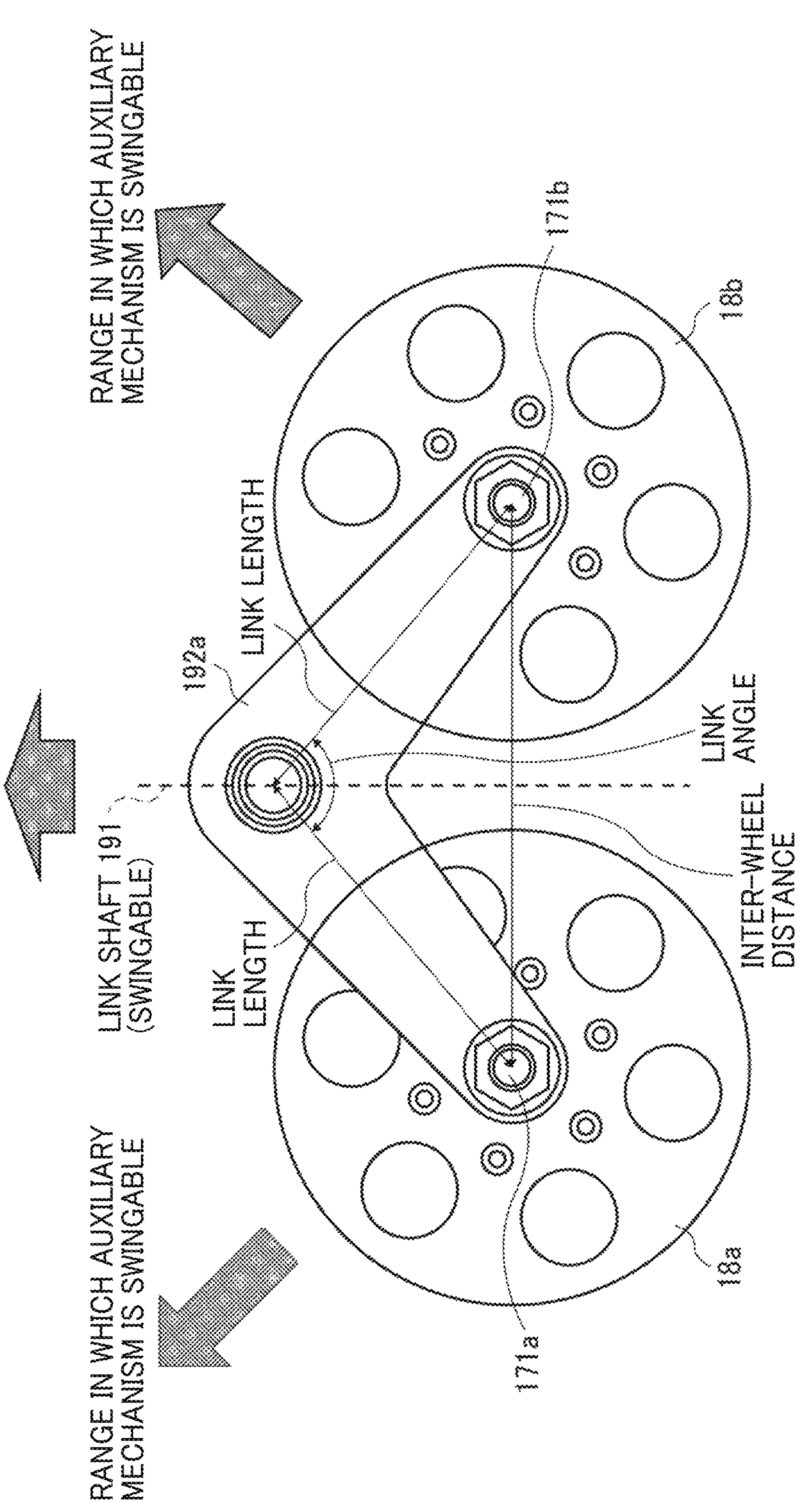
FIG. 18 is a diagram for describing an example of a detailed configuration of the auxiliary mechanism.

Next, a detailed configuration of the auxiliary mechanism 8 will be described with reference to FIGS. 18 to 23. FIGS. 18 and 19 are diagrams for describing an example of the detailed configuration of the auxiliary mechanism. FIG. 18 is a side view (taken in the direction of arrow Q) of the auxiliary mechanism 8 viewed in the traveling direction. The auxiliary mechanism 8 couples the two idlers 18*a* and 18*b* to the link 19 via the link plate 192*a*. The auxiliary mechanism 8 couples the idlers 18*a* and 18*b* such that the idlers 18*a* and 18*b* can swing around the link shaft 191 included in the link 19. Furthermore, the auxiliary mechanism 8 has a shape symmetric with respect to the link shaft 191 in the front-back direction. That is, the idler 18*a* (first auxiliary wheel) is opposite to the idlers 18*b* (second auxiliary wheel) across the perpendicular line extending vertically from the link shaft 191.

It is necessary to install each member of the crawler-type traveling body 10 in a limited space. Therefore, a range in which the auxiliary mechanism 8 can be disposed and a range in which the auxiliary mechanism 8 is swingable are limited by the positional relationship with other members. Specifically, the drive wheel 13 is disposed above the auxiliary mechanism 8. Therefore, the range in which the auxiliary mechanism 8 can be disposed is restricted by the installation position and size of the drive wheel 13 relative to the size of the crawler-type traveling body 10. In addition, the track rollers 15*a* and 15*b* are disposed in front of and behind the auxiliary mechanism 8. Therefore, the range in which the auxiliary mechanism 8 is swingable is restricted by the installation positions and sizes of the track rollers 15*a* and 15*b* relative to the size of the crawler-type traveling body 10.

Thus, for example, in a case where the auxiliary mechanism 8 is provided in a limited space so as to improve road-hugging properties of the crawler-type traveling body 10 during traveling on uneven ground, it is necessary to optimally design a link length, an inter-wheel distance, and a link angle as illustrated in FIG. 18. FIG. 19 schematically illustrates the side view of the auxiliary mechanism 8 illustrated in FIG. 18. As illustrated in FIG. 19, a link length L refers to a length of a line segment connecting the link shaft 191 (shaft center O) and the axle shaft 171*a* (shaft center w0) of the idler 18*a*. The link length L also refers to a length of a line segment connecting the link shaft 191 (shaft center O) and an axle shaft 171*b* (shaft center w1) of the idler 18*b*. An inter-wheel distance W refers to a length of a line segment joining the axle shaft 171*a* (shaft center w0) and the axle shaft 171*b* (shaft center w1). A link angle θ refers to an angle between the two line segments each having a length represented by the link length L. Here, the line segment joining the axle shaft 171*a* (shaft center w0) of the idler 18*a* and the link shaft 191 (shaft center O) is an example of a first line segment. The line segment joining the axle shaft 171*b* (shaft center w1) of the idler 18*b* and the link shaft 191 (shaft center O) is an example of a second line segment.

There are cases where part of the crawler of the crawler-type traveling body cannot be in contact with the ground, and may be lifted off the ground due to, for example, unevenness of a road surface of uneven ground or the like on which the crawler-type traveling body travels. Therefore, the idlers 18*a* and 18*b* preferably move independently so as to be in contact with a road surface on which the crawler-type traveling body 10 travels. Thus, the crawler-type traveling body 10 has a configuration in which when one of the idlers 18 (idler 18*a*) is pushed up, the other idler (for example, the idler 18*b*) is pushed down by use of swing motion made by the auxiliary mechanism 8.

Here, as illustrated in FIG. 19, the y-axis represents the vertical direction of the auxiliary mechanism 8, and the positions of the axle shafts 171*a* and 171*b* (shaft centers w0 and w1) of the auxiliary mechanism 8 that is horizontally located are expressed as: y=0. In addition, $y_0$ denotes a push-up amount by which the idler 18*a* is pushed up in the vertical direction, and $y_1$ denotes a push-down amount by which the idler 18*b* is pushed down in the vertical direction.

The auxiliary mechanism 8 allows each idler to move independently. As a result, when the idler 18*a* is pushed up, the push-down amount of the other idler, that is, the idler 18*b* is reduced as much as possible. Thus, the crawler-type traveling body 10 can stably travel even if the idler 18*a* is pushed up. That is, the auxiliary mechanism 8 is configured such that the push-up amount $y_0$ of the one of the idlers, that is, the idler 18*a* in the vertical direction is larger than the push-down amount $y_1$ of the other idler, that is, the idler 18*b* in the vertical direction. With such a configuration, it is possible to install, in a limited size, the auxiliary mechanism 8 which improves road-hugging properties of the crawler-type traveling body 10.

[Design Configuration of Auxiliary Mechanism]

Next, an optimum design configuration of the auxiliary mechanism 8 will be described. The link length L and the link angle θ of the auxiliary mechanism 8 are determined by the range in which the auxiliary mechanism 8 can be disposed, the range in which the auxiliary mechanism 8 is swingable, the inter-wheel distance W, and the diameters of the idlers 18*a* and 18*b*, as illustrated in FIG. 18. First, with reference to FIGS. 20 and 21, a description will be given of relationships between the push-up amount $y_0$ and the push-down amount $y_1$ to be illustrated in a case where either of values of the link length L and the link angle θ is fixed and the other value is changed.

Figure 20:
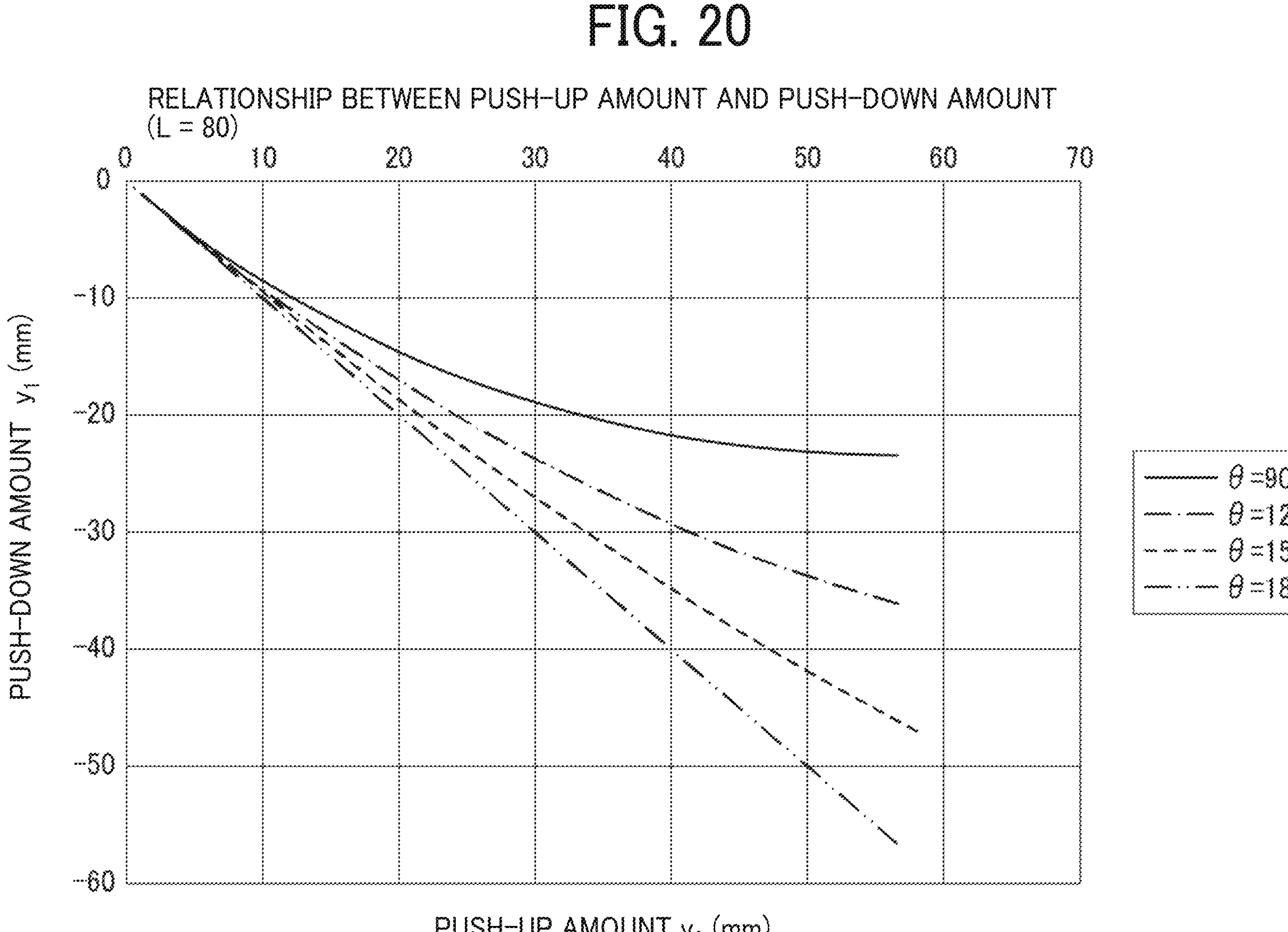
FIG. 20 is a graph showing examples of a relationship between a push-up amount and a push-down amount in the auxiliary mechanism.

FIG. 20 illustrates relationships between the push-up amount $y_0$ and the push-down amount $y_1$ to be illustrated in a case where the link length L is fixed to 80 mm (L=80) and the link angle θ is set to 90°, 120°, 150°, and 180°. As illustrated in FIG. 20, the push-up amount $y_0$ is less affected by the push-down amount $y_1$ as the link angle θ decreases.

Figure 21:
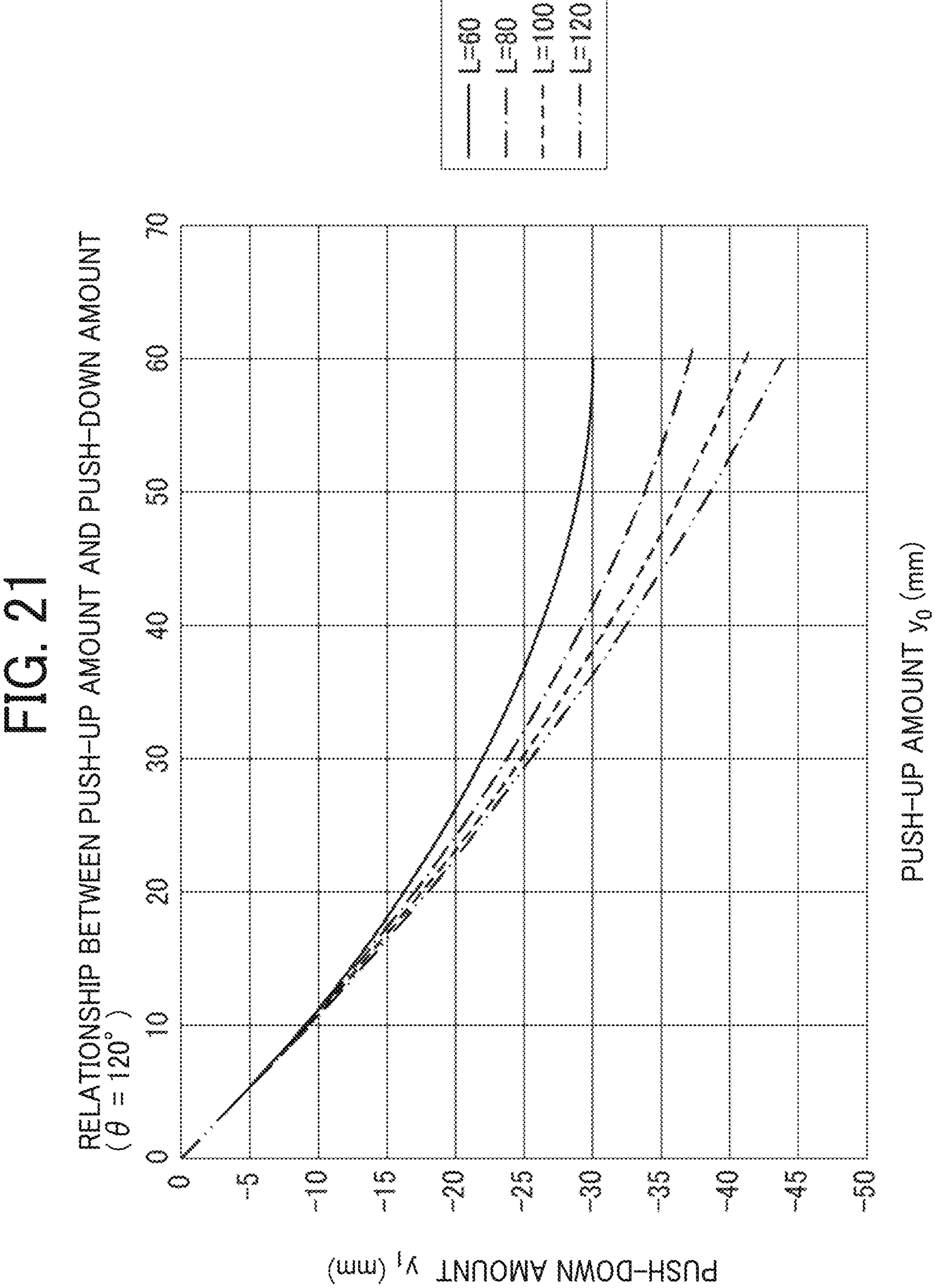
FIG. 21 is a graph showing examples of the relationship between the push-up amount and the push-down amount in the auxiliary mechanism.

FIG. 21 illustrates relationships between the push-up amount $y_0$ and the push-down amount $y_1$ to be illustrated in a case where the link angle θ is fixed to 120° (θ=120°) and the link length L is set to 60 mm, 80 mm, 100 mm, and 120 mm. As illustrated in FIG. 21, the push-up amount $y_0$ is less affected by the push-down amount $y_1$ as the link length L decreases. Therefore, the influence of the push-down amount $y_1$ on the push-up amount $y_0$ can be reduced as the link angle θ and the link length L decrease in the auxiliary mechanism 8.

Next, with reference to FIGS. 22A and 22B, a description will be given of relationships between the push-up amount $y_0$ and the push-down amount $y_1$ to be illustrated in a case where the value of the inter-wheel distance W is fixed and the values of the link length L and the link angle θ are changed. If any two values of the link length L, the inter-wheel distance W, and the link angle θ are determined, the remaining one value is uniquely determined. That is, when the inter-wheel distance W is constant, the values of the link length L and the link angle θ have a relationship in which if one is determined, the other is also determined.

Figure 22A:
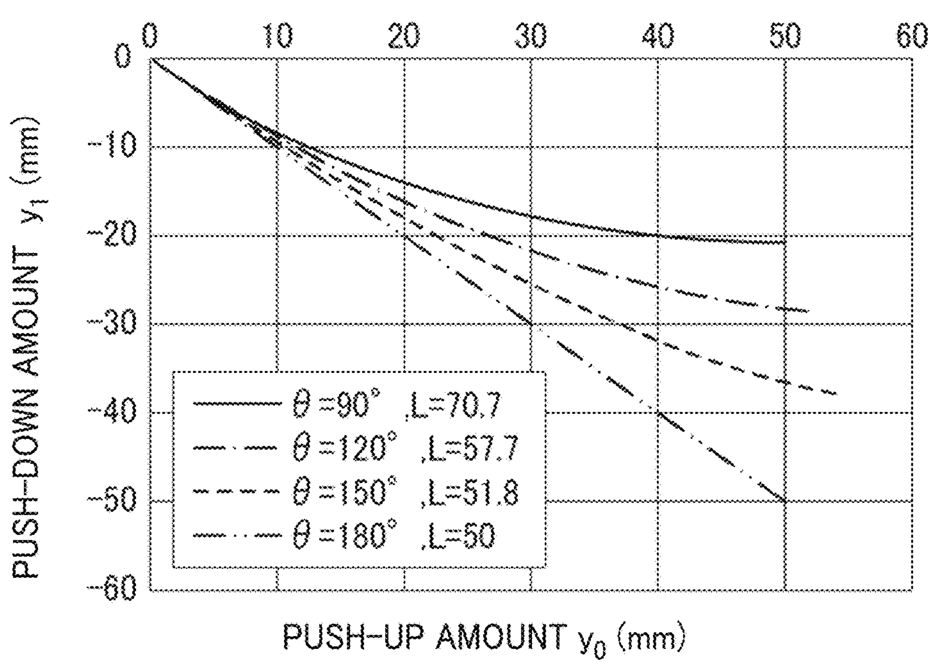
FIGS. 22A and 22B are graphs showing examples of the relationship between the push-up amount and the push-down amount in the auxiliary mechanism.

FIG. 22A illustrates relationships between the push-up amount $y_0$ and the push-down amount $y_1$ to be illustrated in a case where the inter-wheel distance W is fixed to 100 mm (W=100) and the link angle θ is set to 90°, 120°, 150°, and 180°. In the case illustrated in FIG. 22A, when the link angle θ is set to 90°, 120°, 150°, and 180°, the link lengths L are 70.7 mm, 57.7 mm, 51.8 mm, and 50 mm, respectively. Meanwhile, FIG. 22B illustrates relationships between the push-up amount $y_0$ and the push-down amount $y_1$ to be illustrated in a case where the inter-wheel distance W is fixed to 120 mm (W=120) and the link angle θ is set to 90°, 120°, 150°, and 180°. In the case illustrated in FIG. 22B, when the link angle θ is set to 90°, 120°, 150°, and 180°, the link lengths L are 84.9 mm, 69.3 mm, 62.1 mm, and 60 mm, respectively.

Figure 22B:
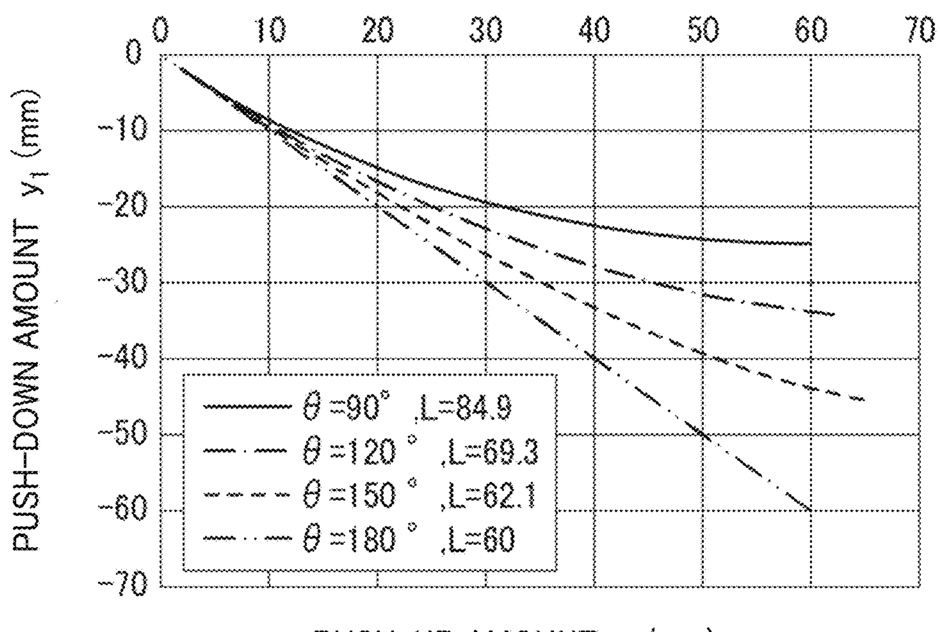

As illustrated in FIGS. 22A and 22B, the push-up amount $y_0$ is less affected by the push-down amount $y_1$ in the case of decreasing the link angle θ than in the case of decreasing the link length L. Therefore, the auxiliary mechanism 8 is designed to reduce the link angle θ according to size restriction of the crawler-type traveling body 10. As a result, it is possible to reduce the influence of the pushing-down (sinking) of one of the idlers 18 on the pushing-up (protrusion) of the other idler.

Here, a case where the push-up amount $y_0$ of one of the idlers, that is, the idler 18*a* is ½ (half) of the inter-wheel distance W and the push-down amount $y_1$ of the other idler, that is, the idler 18*b* is ¼ (quarter) or less of the inter-wheel distance W is cited as an example of a preferable relationship between the push-up amount $y_0$ and the push-down amount $y_1$ for improving the road-hugging properties of the crawler-type traveling body 10. That is, when the push-down amount $y_1$ is half or less of the push-up amount $y_0$, the crawler-type traveling body 10 can further improve road-hugging properties by using the auxiliary mechanism 8.

When boundary values of the link angle θ and the link length L satisfying a condition of $y_1 \leq y_0/2$ are calculated by use of definitions illustrated in FIG. 19, the condition does not depend on the link length L, and the boundary value of the link angle θ is obtained as: θ≤105°. In the case of θ<90°, when one of the idlers, that is, the idler 18*a* is pushed up by W/2, the other idler, that is, the idler 18*b* may be located at a level higher than the level of the link shaft 191. Accordingly, it is possible to further improve the road-hugging properties of the crawler-type traveling body 10 by providing the auxiliary mechanism 8 such that the link angle θ falls within a range of greater than 90° and equal to or less than 105° (90°≤θ≤105°).

Figure 23:
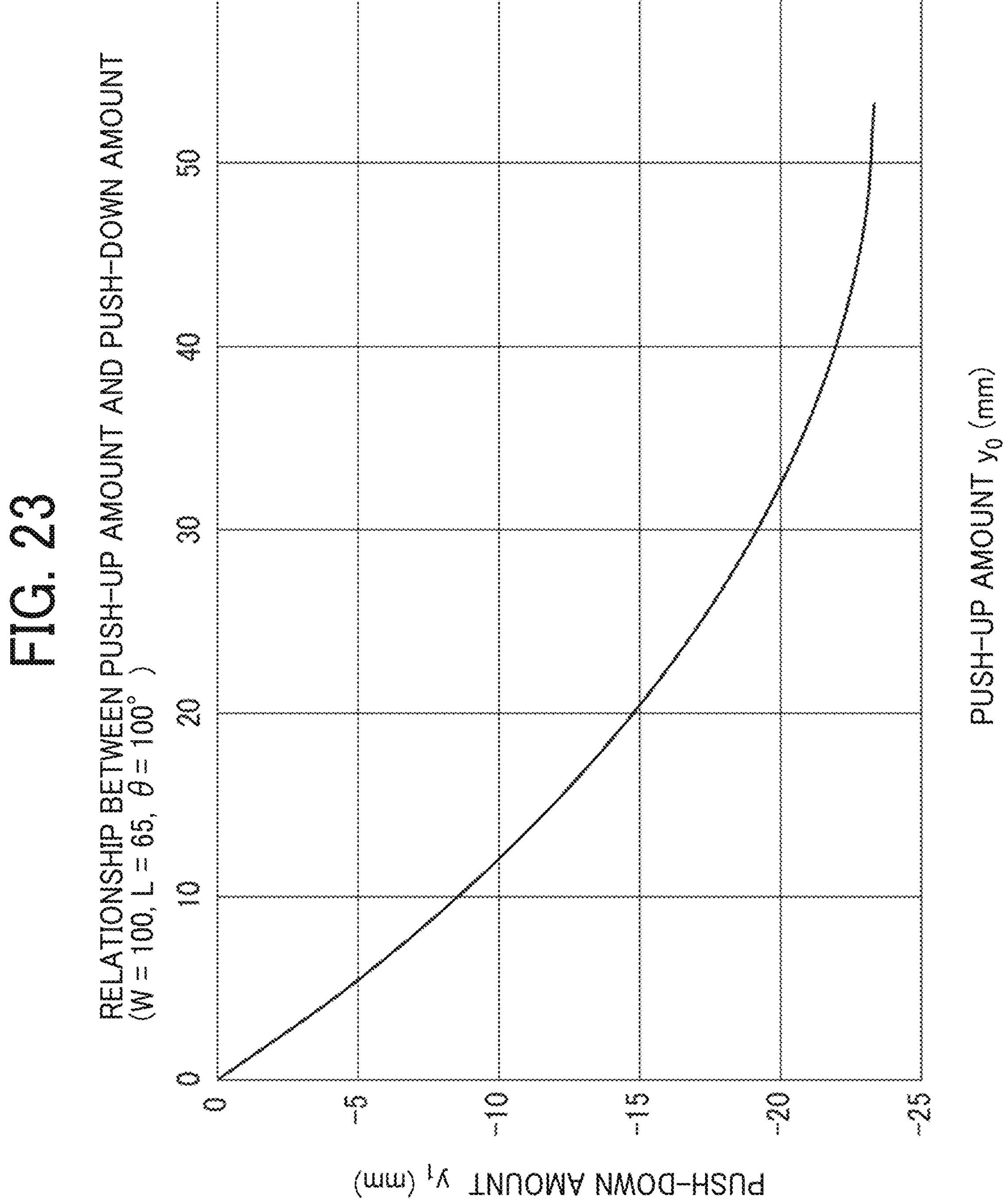
FIG. 23 is a graph showing an example of the relationship between the push-up amount and the push-down amount in the auxiliary mechanism.

Next, an example of disposing the auxiliary mechanism 8 in such a way as to satisfy a condition of $y_1 \leq W/4$ will be described with reference to FIG. 23. FIG. 23 illustrates a relationship between the push-up amount $y_0$ and the push-down amount $y_1$ to be illustrated in a case where the inter-wheel distance W is set to 100 mm (W=100), the link length L is set to 65 mm (L=65), and the link angle θ is set to 100° (θ=100°). As illustrated in FIG. 23, it is possible to achieve the push-down amount $y_1$ not exceeding W/4, by setting the inter-wheel distance W, the link angle θ, and the link length L of the auxiliary mechanism 8 to the values described above.

The above description has been given from the viewpoint of the influence of the push-down amount on the push-up amount. Meanwhile, the same applies to a relationship between the push-up amount $y_0$ and the push-down amount $y_1$ to be described from the viewpoint of the influence of the push-up amount $y_0$ of one of the idlers, that is, the idler 18*b* on the push-down amount $y_1$ of the other idler, that is, the idler 18*a* that has been pushed down.

Application Example of Traveling Apparatus

It is possible to use the traveling apparatus 1 including the crawler-type traveling body 10 described above in various usage scenes by attaching, to the main body 50, a device or a member for implementing a function according to an application purpose. Taking advantage of high turning performance, the traveling apparatus 1 is used as, for example, a work robot that performs light work such as conveyance of articles at a site such as a factory or a warehouse having a narrow passage. In such a case where the traveling apparatus 1 is used as a work robot, for example, a loading platform for conveyance and a movable arm for light work are attached to the traveling apparatus 1.

In addition, the traveling apparatus 1 is also used for, for example, rescue operations or reconstruction support at disaster sites, agricultural applications, construction sites, outdoor factories, outdoor plants, or other outdoor facilities. Taking advantage of characteristics of the crawler-type traveling body 10 such as traveling stability, the traveling apparatus 1 can reduce the risk of occurrence of a failure during traveling when used for such application purposes in, for example, an environment with a rough road surface where rubble or garbage is scattered.

Furthermore, when equipped with an imaging device or a display device, the traveling apparatus 1 is also used as a telepresence robot that implements interactive communication (remote communication) between a user on a site where the traveling apparatus 1 is located and a user at a remote location. Use of the telepresence robot makes it possible to, for example, remotely perform management or maintenance work of a device on the site, or remotely check a position or a traffic line of a person located on the site. The traveling apparatus 1 may also be configured such that the traveling apparatus 1 travels in response to remote control from a user at a remote location.

As described above, the traveling apparatus 1 includes the crawler-type traveling body 10 including the auxiliary mechanism 8 in which the two idlers 18*a* and 18*b* are swingably provided. It is thus possible to improve the road-hugging properties of the traveling apparatus 1, and to achieve stable traveling in such a way as to prevent the traveling apparatus 1 from falling. In addition, the traveling apparatus 1 is equipped with the auxiliary mechanism 8 including the link 19 with the link angle θ determined in consideration of the size and the link length L of the crawler-type traveling body 10. Therefore, it is possible to improve the road-hugging properties and traveling stability of the crawler-type traveling body 10.

As described above, a crawler-type traveling body according to one embodiment of the present disclosure is the crawler-type traveling body 10 including: the crawler 11; the drive wheel 13 that applies a driving force to the crawler 11; and at least two track rollers 15*a* and 15*b* disposed below the drive wheel 13, the crawler 11 being stretched around the drive wheel 13 and the track rollers 15*a* and 15*b*. The crawler-type traveling body 10 also includes: the auxiliary mechanism 8 in which the two idlers 18*a* and 18*b* (an example of auxiliary wheels) are swingably provided, the auxiliary mechanism 8 being provided between the two track rollers 15*a* and 15*b*, wherein in a case where the idler 18*a* (an example of one of the auxiliary wheels) is pushed up in the vertical direction, the push-up amount $y_0$ of the idler 18*a* is larger than the push-down amount $y_1$ of the idler 18*b* (an example of another of the auxiliary wheels). Accordingly, the crawler-type traveling body 10 can enhance stability during traveling.

In the crawler-type traveling body according to the one embodiment of the present disclosure, the auxiliary mechanism 8 includes the link 19 (an example of a coupler) that swingably couples the two idlers 18*a* and 18*b* (an example of auxiliary wheels), and the auxiliary mechanism 8 is coupled to the crawler-type traveling body 10 via the link 19. Thus, the auxiliary mechanism 8 in which the two idlers 18*a* and 18*b* move independently is provided in the crawler-type traveling body 10. Therefore, even if the idler 18*a* is pushed up, it is possible to allow the crawler-type traveling body 10 to stably travel by reducing the push-down amount of the other idler, that is, the idler 18*b* as much as possible.

Furthermore, in the crawler-type traveling body according to the one embodiment of the present disclosure, an angle θ between a first line segment and a second line segment is in a range defined as 90°<θ≤105°, the first line segment joining the axle shaft 171*a* of the idler 18*a* (an example of one of the auxiliary wheels) to the link shaft 191 (an example of a swing shaft) of the auxiliary mechanism 8, the second line segment joining the axle shaft 171*b* of the idler 18*b* (an example of another of the auxiliary wheels) to the link shaft 191. Thus, the crawler-type traveling body 10 is equipped with the auxiliary mechanism 8 such that the push-down amount $y_1$ is equal to or less than a half of the push-up amount $y_0$. As a result, it is possible to further improve road-hugging properties by means of the auxiliary mechanism 8, and enhance stability during traveling.

The traveling apparatus according to the one embodiment of the present disclosure also includes: the crawler-type traveling body 10; and the main body 50 that supports at least two crawler-type traveling bodies 10 (10*a*, 10*b*) in such a way as to allow the crawler-type traveling bodies 10 (10*a*, 10*b*) to travel. As a result, the traveling apparatus 1 can improve the stability of the traveling apparatus 1 including the main body 50.

[Supplement]

The crawler-type traveling body and the traveling apparatus according to one embodiment of the present disclosure have been described above. Meanwhile, the present disclosure is not limited to the above-described embodiment, and addition of another embodiment, changes, deletion, or the like can be made so as to change the above-described embodiment within a range that a person skilled in the art can conceive. Any aspect is included in the scope of the present disclosure as long as the function and effect of the present disclosure are achieved.

This patent application is based on and claims priority to Japanese Patent Application No. 2020-164419, filed on Sep. 30, 2020, in the Japan Patent Office, and Japanese Patent Application No. 2021-093610, filed on Jun. 3, 2021, in the Japan Patent Office, the entire disclosure of which is hereby incorporated by reference herein.

REFERENCE SIGNS LIST

1 traveling apparatus
8 auxiliary mechanism
10 (10*a*, 10*b*) crawler-type traveling body
11 crawler
13 drive wheel
14 in-wheel motor
15*a*, 15*b* track roller
18*a*, 18*b* idler (example of auxiliary wheel)
19 link (example of a coupler)
20*a*, 20*b* side plate
25 tensioner
141 motor shaft
161*a*, 161*b* track roller shaft
163*a* bearing
165*a*1, 165*a*2 set collar
167*a*1, 167*a*2 oil seal
171*a* axle shaft
173*a* bearing
175*a*1, 175*a*2 set collar
177*a*1, 177*a*2 oil seal
191 link shaft (example of swing shaft)
192*a*, 192*b* link plate (example of swing portion)
193*a*, 193*b* set collar
195*a*, 195*b* bush member

The invention claimed is:

1. A crawler-type traveling body comprising:
a crawler;
a drive wheel including a drive shaft, the drive wheel configured to apply a driving force to the crawler;
at least two track rollers disposed below the drive wheel, the crawler being stretched around the drive wheel and said at least two track rollers;
an auxiliary mechanism between said at least two track rollers, the auxiliary mechanism includes:
a swing shaft;
a first auxiliary wheel; and
a second auxiliary wheel, the first auxiliary wheel and the second auxiliary wheel being swingable around the swing shaft; and
a tensioner coupled to the drive shaft of the drive wheel, the tensioner configured to press the drive wheel against the crawler to apply tension to the crawler,
wherein a push-up amount of the first auxiliary wheel pushed up in a vertical direction is larger than a push-down amount of the second auxiliary wheel pushed down in the vertical direction in a swing movement of the auxiliary mechanism, and
the drive wheel includes an in-wheel motor that transmits a rotative force to the drive wheel.

2. The crawler-type traveling body according to claim 1, further comprising side plates configured to support the swing shaft,
wherein auxiliary mechanism includes a coupler coupling the first auxiliary wheel and the second auxiliary wheel, and
the swing shaft is coupled to the side plates and is configured to swingably support the coupler.

3. The crawler-type traveling body according to claim 2, wherein the first auxiliary wheel has a first axle shaft,
the second auxiliary wheel has a second axle shaft,
a first line segment joins the first axle shaft and the swing shaft,
a second line segment joins the second axle shaft and the swing shaft, and
an angle θ between the first line segment and the second line segment is in a range of $90° < \theta \leq 105°$.

4. The crawler-type traveling body according to claim 3, wherein the coupler includes:
a swing portion having a double-sided structure configured to support the first auxiliary wheel and the second auxiliary wheel; and
a set collar configured to secure the swing portion to the swing shaft.

5. The crawler-type traveling body according to claim 4, wherein the coupler includes a bush member at a junction between the swing portion and the swing shaft.

6. The crawler-type traveling body according to claim 4, wherein each of the first auxiliary wheel and the second auxiliary wheel includes an oil seal inside the double-sided structure.

7. The crawler-type traveling body according to claim 1, wherein the first auxiliary wheel has a first axle shaft,
the second auxiliary wheel has a second axle shaft,
the first auxiliary wheel includes a first bearing at a center of the first axle shaft, and
the second auxiliary wheel includes a second bearing at a center of the second axle shaft.

8. The crawler-type traveling body according to claim 7, the first auxiliary wheel includes a first set collar at each side of the first bearing, and
the second auxiliary wheel includes a second set collar at each side of the second bearing.

9. The crawler-type traveling body according to claim 1, wherein a part of the crawler between said at least two track rollers is in contact with a road surface, and
a perpendicular line from the drive shaft of the drive wheel is perpendicular to a straight line connecting shafts of said at least two track rollers, and
the first auxiliary wheel is opposite to the second auxiliary wheel across the perpendicular line.

10. The crawler-type traveling body according to claim 9, wherein the first auxiliary wheel is symmetric to the second auxiliary wheel with respect to the perpendicular line.

11. The crawler-type traveling body according to claim 1, wherein the push-up amount of the first auxiliary wheel is a half of a distance between the first auxiliary wheel and the second auxiliary wheel, and
the push-down amount of the second auxiliary wheel is equal to or less than a quarter of the distance.

12. The crawler-type traveling body according to claim 1, further comprising side plates supporting the drive wheel and said at least two track rollers.

13. A traveling apparatus comprising:
a plurality of crawler-type traveling bodies including the crawler-type traveling body according to claim 1; and
a main body coupling at least two of the plurality of crawler-type traveling bodies.

14. The crawler-type traveling body according to claim 1, wherein the auxiliary mechanism includes a link supporting the first auxiliary wheel and the second auxiliary wheel, and the crawler-type traveling body further includes a position control motor to adjust heights of the first auxiliary wheel and the second auxiliary wheel by moving the link up and down to change a height of the link.

* * * * *